United States Patent
Kimura et al.

(10) Patent No.: US 10,962,695 B2
(45) Date of Patent: Mar. 30, 2021

(54) OPTICAL REFLECTION FILM

(71) Applicant: Konica Minolta, Inc., Tokyo (JP)

(72) Inventors: Akiyoshi Kimura, Hino (JP); Yoichi Saito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 234 days.

(21) Appl. No.: 16/065,418

(22) PCT Filed: Dec. 15, 2016

(86) PCT No.: PCT/JP2016/087409
§ 371 (c)(1),
(2) Date: Jun. 22, 2018

(87) PCT Pub. No.: WO2017/110651
PCT Pub. Date: Jun. 29, 2017

(65) Prior Publication Data
US 2019/0004224 A1    Jan. 3, 2019

(30) Foreign Application Priority Data
Dec. 25, 2015 (JP) .............. JP2015-255322

(51) Int. Cl.
G02B 5/28 (2006.01)
G02B 5/26 (2006.01)

(52) U.S. Cl.
CPC .............. *G02B 5/281* (2013.01); *G02B 5/26* (2013.01); *G02B 5/28* (2013.01); *G02B 5/282* (2013.01); *G02B 5/283* (2013.01)

(58) Field of Classification Search
CPC . G02B 5/281; G02B 5/26; G02B 5/28; G02B 5/282; G02B 5/283
USPC .......................................................... 359/359
See application file for complete search history.

(56) References Cited

U.S. PATENT DOCUMENTS

| 2014/0192413 A1* | 7/2014 | Kokeguchi | G02B 5/26 |
| | | | 359/584 |
| 2015/0132499 A1* | 5/2015 | Kimura | B05D 1/34 |
| | | | 427/402 |

FOREIGN PATENT DOCUMENTS

| CN | 104011569 A | | 8/2014 | |
| JP | S6110483 | * | 1/1986 | .............. B41M 5/52 |
| JP | 2012093482 A | | 5/2012 | |
| JP | WO2013172415 A1 | * | 11/2013 | |
| WO | 2014143366 A1 | | 9/2014 | |
| WO | 2015050171 A1 | | 4/2015 | |

OTHER PUBLICATIONS

International Search Report corresponding to Application No. PCT/JP2016/087409; dated Apr. 4, 2017.
CNIPA First Office Action for corresponding CN201680074657.X; dated Mar. 4, 2020.
JPO Notice of Reasons for Refusal corresponding to JP Application No. 2017-558074, dated Sep. 29, 2020.

* cited by examiner

Primary Examiner — George G King
(74) Attorney, Agent, or Firm — Cantor Colburn LLP

(57) ABSTRACT

An optical reflection film in which haze is reduced and cracking hardly occurs. An optical reflection film is provided. An optical reflection film includes at least one unit formed by laminating a low refractive index layer and a high refractive index layer on a substrate. The high refractive index layer contains zirconium oxide particles, and the low refractive index layer contains silicon oxide particles and two or more cationic polymers.

8 Claims, No Drawings

OPTICAL REFLECTION FILM

CROSS REFERENCE TO RELATED APPLICATIONS

This is a U.S. national stage of application No. PCT/JP2016/087409, filed on Dec. 15, 2016. Priority under 35 U.S.C. § 119(a) and 35 U.S.C. § 365(b) is claimed from Japanese Patent Application No. 2015-255322, filed on Dec. 25, 2015, the disclosure of which is also incorporated herein by reference.

TECHNICAL FIELD

The present invention relates to an optical reflection film.

BACKGROUND ART

In recent years, concern for energy saving measures has increased. In order to shield solar radiation energy entering a room or a car in a building glass or a vehicle glass and to reduce a rise in temperature and a cooling load, a heat insulating glass having an infrared shielding property has been adopted. Meanwhile, an infrared shielding film formed by laminating layers having different refractive indices is conventionally known. A method for shielding transmission of a heat ray in sunlight by bonding the infrared shielding film to glass has attracted attention as a simpler method.

Examples of a method for manufacturing an infrared shielding film include a method for manufacturing a laminated film in which a high refractive index layer and a low refractive index layer are alternately laminated by a gas phase film formation method such as a vapor deposition method or sputtering. However, the gas phase film formation method has problems of high manufacturing cost, difficulty in increasing the area, limitation to a heat-resistant material, and the like.

Therefore, for manufacturing the infrared shielding film, it is more advantageous to use a liquid phase film formation method (wet) from viewpoints of low manufacturing cost, capability of increasing the area, and a wide selection range of a substrate. As a technique using the liquid phase film formation method, for example, JP 2012-93482 A discloses a method for manufacturing an optical reflection film by applying a coating liquid containing a mixture of a water-soluble polymer and metal oxide fine particles by a wet coating method and performing lamination (near-infrared reflection film). JP 2012-93482 A describes that a coating liquid containing zirconium oxide as a high refractive index layer coating liquid and a coating liquid containing a low refractive index oxide such as silicon oxide as a low refractive index layer coating liquid are prepared and that these coating liquids are applied in a multilayer manner to prepare a laminated film. This makes it possible to manufacture a high-performance optical reflection film at low cost.

SUMMARY OF INVENTION

Technical Problem

However, as a result of intensive studies by the present inventors, it has been found that, in the optical reflection film described in JP 2012-93482 A, when a high refractive index layer coating liquid and a low refractive index layer coating liquid are applied in a multilayer manner, an interface between layers is disordered by interlayer mixing and that haze occurs in an obtained optical reflection film. In addition, it has been found that cracking easily occurs in the optical reflection film.

Therefore, the present invention has been achieved in view of the above circumstances, and an object of the present invention is to provide an optical reflection film in which haze is reduced and cracking hardly occurs.

Solution to Problem

The present inventors made intensive studies in view of the above problems. As a result, the present inventors have found that the above problems are solved by using two or more cationic polymers in combination in a low refractive index layer in an optical reflection film containing at least one unit formed by laminating a low refractive index layer and a high refractive index layer, containing silicon oxide as a metal oxide of the low refractive index layer, and containing zirconium oxide as a metal oxide of the high refractive index layer, and have completed the present invention.

That is, the above object is achieved by the following means.

1. An optical reflection film including at least one unit formed by laminating a low refractive index layer and a high refractive index layer on a substrate, in which the high refractive index layer contains zirconium oxide particles, and the low refractive index layer contains silicon oxide particles and two or more cationic polymers.

2. The optical reflection film according to the item 1, in which the two or more cationic polymers include a cationic polymer containing a tertiary amino group or a cation (salt) thereof as a cationic group and a cationic polymer containing a quaternary ammonium group.

3. The optical reflection film according to the item 1 or 2, in which the two or more cationic polymers each have a weight average molecular weight of 20,000 to 30,000.

4. A method for manufacturing the optical reflection film according to any one of the items 1 to 3, including laminating the high refractive index layer and the low refractive index layer by a simultaneous multilayer coating method.

DESCRIPTION OF EMBODIMENTS

The present invention is an optical reflection film including at least one unit formed by laminating a low refractive index layer and a high refractive index layer on a substrate, in which the high refractive index layer contains zirconium oxide particles, and the low refractive index layer contains silicon oxide particles and two or more cationic polymers.

The optical reflection film of the present invention suppresses an increase in haze of the film by including two or more cationic polymers in the low refractive index layer together with silicon oxide. Furthermore, occurrence of cracking is suppressed by adopting the above configuration.

The optical reflection film according to the present invention has a structure in which a low refractive index layer containing silicon oxide particles and a high refractive index layer containing zirconium oxide particles are laminated. Here, if the high refractive index layer and the low refractive index layer are manufactured by multilayer coating as in JP 2012-93482 A, an interface of the layers is disordered by interlayer mixing, and haze occurs in an obtained optical reflection film.

Meanwhile, the optical reflection film of the present invention can suppress interlayer mixing between the low refractive index layer and the high refractive index layer during multilayer coating by adding two or more cationic polymers to the low refractive index layer containing silicon oxide. A reason thereof is unclear. However, by using two or more cationic polymers in combination, the cationic polymers become non-uniform, are adsorbed by silicon oxide, and cause slight aggregation to increase an interaction between a resin as a binder and aggregated particles. It is considered that this can suppress mixing with the high refractive index layer during multilayer coating, caused by diffusion of silicon oxide. In addition, it is considered that mixing during multilayer coating can be dramatically suppressed by repulsion of zirconium oxide contained in the high refractive index layer with a high cationic zeta potential. As a result, it is estimated that haze of an obtained optical reflection film can be largely reduced.

In addition, by adding two or more cationic polymers, disorder of an interface during multilayer coating is suppressed. Therefore, concentration of a stress is hardly generated when a film thickness changes due to a change in temperature. Therefore, it is considered that cracking resistance of the optical reflection film is improved. An effect of the present invention can be particularly remarkably obtained when an optical reflection film is manufactured by simultaneous multilayer coating of a low refractive index layer and a high refractive index layer. However, even in a case of sequential coating, slight mixing of each of the refractive index layers with an adjacent refractive index layer or a substrate can be suppressed during coating drying. Therefore, an excellent effect can be obtained.

Hereinafter, constituent elements of the optical reflection film of the present invention will be described in detail. Incidentally, in the following description, in a case where a low refractive index layer and a high refractive index layer are not distinguished from each other, these layers are referred to as "refractive index layers" as a concept including both of the layers.

In addition, here, "X to Y" indicating a range means "X or more and Y or less". In addition, unless otherwise specified, operation and measurement of physical properties and the like are performed under conditions of room temperature (20 to 25° C.)/relative humidity 40 to 50%.

[Optical Reflection Film]

The optical reflection film according to the present invention includes at least one unit formed by laminating a low refractive index layer and a high refractive index layer on a substrate. Incidentally, here, the terms "high refractive index layer" and "low refractive index layer" mean that a refractive index layer having a higher refractive index is referred to as the high refractive index layer and a refractive index layer having a lower refractive index is referred to as the low refractive index layer in a case where refractive index between two adjacent layers is compared. Therefore, the terms "high refractive index layer" and "low refractive index layer" include any form other than a form in which two adjacent refractive index layers have the same refractive index in refractive index layers constituting the optical reflection film. In addition, here, a portion formed by laminating a plurality of units each formed by laminating a low refractive index layer and a high refractive index layer may be simply referred to as "optical reflection layer" or "reflection layer".

The optical reflection film includes a substrate and an optical reflection layer in this order. The optical reflection layer is preferably disposed on a surface of the substrate on which light is incident. Furthermore, the optical reflection layer may be disposed adjacent to the substrate, or another layer may be interposed between the substrate and the optical reflection layer.

In the optical reflection film of the present invention, the high refractive index layer constituting the reflection layer contains zirconium oxide particles, and the low refractive index layer contains silicon oxide particles and two or more cationic polymers. Hereinafter, components contained in each of the refractive index layers will be described in detail.

(Cationic Polymer)

In the optical reflection film according to the present invention, the low refractive index layer contains two or more cationic polymers together with silicon oxide particles.

Here, the cationic polymer means a polymer having a cation or a cationic group.

The cationic polymer may be an inorganic polymer or an organic polymer.

Examples of the inorganic polymer include an inorganic polymer containing a metal oxide, formed by hydrolysis polycondensation of a metal salt compound capable of hydrolysis polycondensation by a so-called sol-gel method. An inorganic polymer formed by hydrolysis polycondensation of a compound containing a zirconium atom, a compound containing an aluminum atom, or the like is particularly preferable.

In these inorganic polymers, an OH group generated during a process of hydrolysis remains even after a polycondensation reaction, and therefore a network of OH hydrogen bonds is formed. As a result, it is considered that flexibility is improved.

Specific examples of the inorganic polymer containing a zirconium atom include zirconyl chloride and, zirconyl nitrate. Specific product names of the above compounds include Zircosol ZC-2 (zirconyl chloride) manufactured by Daiichi Kigenso Kagaku Kogyo and Zircosol ZN (zirconyl nitrate) manufactured by Daiichi Kigenso Kagaku Kogyo.

Specific examples of the inorganic polymer containing an aluminum atom include basic aluminum chloride, basic aluminum sulfate, and basic aluminum sulfate silicate. Among these compounds, basic aluminum chloride and basic aluminum sulfate are preferable. Specific product names of the above compounds include Takibine #1500 manufactured by Taki Chemical Co., Ltd.

The structural formula of the Takibine #1500 is illustrated below.

[Chemical formula 1]

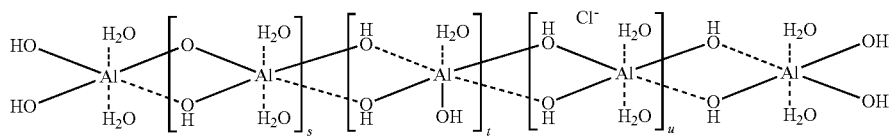

Basic aluminum chloride (Takibine #1500)

Here, s, t, and u each represent an integer of 1 or more.

The cationic polymer in the present invention is preferably an organic polymer. A reason for this is as follows. That is, the organic polymer has better stretchability than the inorganic polymer, and therefore even in a case where silicon oxide particles are highly filled in order to maintain a refractive index, the organic polymer easily follows expansion and shrinkage of a layer due to a change in temperature and hardly causes cracking.

The cationic polymer which is an organic polymer is not particularly limited. However, examples thereof include a vinylpyrrolidone/N,N-dimethylaminoethyl methacrylic acid copolymer sulfate polymer, starch sugar hydroxypropyltrimethyl ammonium chloride ether, polyethyleneimine, polyallylamine, polyvinyl amine, polyvinyl pyridine, a polyethylene imine-epichlorohydrin reaction product, a polyamide-polyamine resin, a polyimide-epichlorohydrin resin, a chitosan, cationized starch, polyamine sulfone, polyvinyl imidazole, polyamidine, a dicyanamide polyalkylene polyamine condensate, a polyalkylene polyamine dicyandiamide ammonium salt condensate, a dicyandiamide formalin condensate, a diallyldimethylammonium chloride polymer and copolymer, a vinylpyrrolidone/vinylimidazole copolymer, a vinylbenzyltrimethylammonium chloride polymer and copolymer, a dimethylaminoethyl (meth)acrylate polymer and copolymer, a (meth)acryloyloxyalkyltrialkylammonium chloride polymer and copolymer, and a (meth)acryloyloxyalkyl dialkylbenzylammonium chloride polymer.

In addition, for example, a cation-modified polyvinyl alcohol having primary to tertiary amino groups or a quaternary ammonium group in a main chain or a side chain of the polyvinyl alcohol as described in JP 61-10483 A can also be used. The cation-modified polyvinyl alcohol is obtained by saponifying a copolymer of an ethylenically unsaturated monomer having a cationic group and vinyl acetate.

Examples of the ethylenically unsaturated monomer having a cationic group include trimethyl-(2-acrylamido-2,2-dimethylethyl) ammonium chloride, trimethyl-(3-acrylamido-3,3-dimethylpropyl) ammonium chloride, N-vinylimidazole, N-vinyl-2-methylimidazole, N-(3-dimethylaminopropyl) methacrylamide, hydroxyethyltrimethylammonium chloride, trimethyl-(2-methacrylamidopropyl) ammonium chloride, and N-(1,1-dimethyl-3-dimethylaminopropyl) acrylamide. A ratio of the cation-modified group-containing monomer in the cation-modified polyvinyl alcohol is, for example, 0.1 to 10% by mol, and preferably 0.2 to 5% by mol with respect to vinyl acetate.

The cationic polymer in the present invention preferably uses at least one organic amine-based polymer having primary to tertiary amino groups or cations (salts) thereof or a quaternary ammonium group as a cationic group because a hydroxy group on surfaces of silicon oxide particles are relatively strongly bonded to an amino group or an ammonium group.

Examples thereof include polyallylamine and a quaternized compound thereof, polyallylamine hydrochloride (PAH), polydiallyl dimethyl ammonium chloride (PDDA), polyvinyl pyridine (PVP), polylysine, polyacrylamide, polypyrrole, polyaniline, polyparaphenylene (+), polyparaphenylenevinylene, polyethyleneimine, a copolymer containing at least one thereof, and various salts thereof.

More specific examples thereof include polyallylamine amide sulfate, a copolymer of allylamine hydrochloride and diallylamine hydrochloride, a copolymer of allylamine hydrochloride and dimethylallylamine hydrochloride, a copolymer of allylamine hydrochloride and another compound, a partially methoxycarbonylated allylamine polymer, a partially methylcarbonylated allylamine acetate polymer, a diallylamine hydrochloride polymer, a methyldiallylamine hydrochloride polymer, a methyldiallylamine amide sulfate polymer, methyldiallylamine acetate polymer, a copolymer of diallylamine hydrochloride and sulfur dioxide, a copolymer of diallylamine acetate and sulfur dioxide, a copolymer of diallylmethylethylammonium ethyl sulfate and sulfur dioxide, a copolymer of methyldiallylamine hydrochloride and sulfur dioxide, a copolymer of diallyldimethylammonium chloride and sulfur dioxide, a copolymer of diallyldimethylammonium chloride and acrylamide, a copolymer of diallyldimethylammonium chloride and a diallylamine hydrochloride derivative, a copolymer of dimethylamine and epichlorohydrin, a copolymer of dimethylamine, ethylenediamine, and epichlorohydrin, and a copolymer of polyamide polyamine and epichlorohydrin.

In the present invention, by using two or more cationic polymers in the low refractive index layer, as compared with a case of not using a cationic polymer or using only one cationic polymer, silicon oxide particles can be dispersed in the low refractive index layer without sedimentation while slight aggregation of silicon oxide particles occurs. As a result, an optical reflection film with low haze can be obtained. Therefore, when the two cationic polymers, that is, a cationic polymer having a high effect of maintaining dispersion stability of silicon oxide particles and a cationic polymer having a high aggregation property are used in combination, the effect of the present invention can be more remarkably obtained. For example, a cationic polymer having a tertiary amino group, a primary amino group, a secondary amino group, or a cation (salt) thereof as a cationic group, particularly a cationic polymer having a tertiary amino group or a cation (salt) thereof effectively cationizes surfaces of silicon oxide particles and contributes to maintaining dispersion stability of the silicon oxide particles in a coating liquid forming the low refractive index layer. Therefore, the cationic polymer in the low refractive index layer preferably contains a cationic polymer having a tertiary amino group or a cation (salt) thereof as a cationic group. Meanwhile, a cationic polymer having a quaternary ammonium group, a primary amino group, a secondary amino group, or a cation (salt) thereof as a cationic group, particularly a cationic polymer having a quaternary ammonium group causes slight aggregation of silicon oxide particles and has an effect of protecting the silicon oxide particles. Therefore, by further using a cationic polymer having a quaternary ammonium group, it is easy to cause slight aggregation of silicon oxide particles without sedimentation, and the effect of the present invention can be more remarkably obtained. Therefore, in the present invention, as the two or more cationic polymers contained in the low refractive index layer, a cationic polymer containing a tertiary amino group or a cation (salt) thereof as a cationic group and a cationic polymer containing a quaternary ammonium group are preferably contained.

Particularly, a methyldiallylamine hydrochloride polymer, a methyldiallylamine amide sulfate polymer, a methyldiallylamine acetate polymer, and the like can be preferably used as the cationic polymer containing a tertiary amino group or a cation (salt) thereof. A diallyldimethylammonium chloride polymer and the like can be preferably used as the cationic polymer containing a quaternary ammonium group.

The content of the cationic polymers is not particularly limited as long as the effect of the present invention is exhibited. However, each of the cationic polymers is preferably 0.5 to 20% by mass, more preferably 1 to 10% by mass, and still more preferably 2 to 5% by mass with respect to the total amount of metal oxide particles including silicon oxide particles contained in the low refractive index layer. The total content of the two or more cationic polymers is not particularly limited but is preferably within the above range with respect to the total amount of metal oxide particles including silicon oxide particles contained in the low refractive index layer. A case where the content is 0.5% by mass or more is preferable because the effect of the present invention can be remarkably obtained. In addition, a case where the content is 20% by mass or less is preferable because deterioration in light resistance due to a cationic polymer does not occur.

The weight average molecular weight of the cationic polymer is not particularly limited. However, the weight average molecular weight of at least one of the two or more cationic polymers is preferably 20,000 to 30,000, and the weight average molecular weight of each of the two or more cationic polymers is more preferably 20,000 to 30,000. Within the above range, the effect of the present invention can be particularly remarkably obtained. Incidentally, here, a value measured by gel permeation chromatography (GPC) is adopted as a value of "weight average molecular weight".

(Resin)

In the optical reflection film of the present invention, the high refractive index layer may contain a resin as a binder together with zirconium oxide particles. In addition, the low refractive index layer also preferably contains a resin. Hereinafter, the resin contained in the high refractive index layer and the low refractive index layer will be described. Note that the resin contained in the high refractive index layer may be the same as or different from the resin contained in the low refractive index layer.

The resin used in each of the high refractive index layer and the low refractive index layer is not particularly limited, but specific examples thereof include a water-soluble resin, a silicone-based resin, an olefin-based resin, a vinyl chloride-based resin, and a fluorine-containing polymer. Among these resins, a water-soluble resin is preferably used as the resin constituting each of the high refractive index layer and the low refractive index layer. In addition, a solvent of the water-soluble resin is water. Therefore, there is also an advantage that corrosion, dissolution, and penetration of a substrate described below do not occur. Furthermore, the water-soluble resin is preferable because durability of the optical reflection layer at the time of bending is improved due to high flexibility. Hereinafter, the water-soluble resin preferably used in the optical reflection film of the present invention will be described.

In the present invention, the water-soluble resin used in each of the high refractive index layer and the low refractive index layer is not particularly limited, but examples thereof include a synthetic water-soluble resin such as a polyvinyl alcohol or a polyvinyl pyrrolidone; and a natural water-soluble resin such as gelatin or a thickening polysaccharide. Among these resins, a polyvinyl alcohol is preferably used from a viewpoint of low oxygen permeability. In addition, the high refractive index layer and the low refractive index layer may each contain an emulsion resin.

The polyvinyl alcohol includes, in addition to an ordinary polyvinyl alcohol obtained by hydrolyzing polyvinyl acetate, a modified polyvinyl alcohol such as an anion-modified polyvinyl alcohol having an anionic group such as a carboxyl group, a nonion-modified polyvinyl alcohol having a nonionic group, or a silyl-modified polyvinyl alcohol having a silyl group.

A polyvinyl alcohol obtained by hydrolyzing polyvinyl acetate has an average polymerization degree preferably of 200 or more, more preferably of 1,000 or more, still more preferably of 1,500 to 5,000, particularly preferably of 2,000 to 5,000. This is because a polyvinyl alcohol having a polymerization degree of 200 or more causes no cracking in a coating film, and a polyvinyl alcohol having a polymerization degree of 5,000 or less stabilizes a coating liquid. Note that stabilization of the coating liquid means sequential stabilization of the coating liquid. The same applies below.

In addition, a polyvinyl alcohol has a saponification degree preferably of 70 to 100% by mol, more preferably of 80 to 99.5% by mol from a viewpoint of solubility in water.

Examples of the anion-modified polyvinyl alcohol include a polyvinyl alcohol having an anionic group as described in JP 1-206088 A, a copolymer of a vinyl alcohol and a vinyl compound having a water-soluble group as described in JP 61-237681 A and JP 63-307979 A, and a modified polyvinyl alcohol having a water-soluble group as described in JP 7-285265 A.

Examples of the nonion-modified polyvinyl alcohol include a polyvinyl alcohol derivative obtained by adding a polyalkylene oxide group to a part of a vinyl alcohol as described in JP 7-9758 A, a block copolymer of a vinyl compound having a hydrophobic group and a vinyl alcohol as described in JP 8-25795 A, a silanol-modified polyvinyl alcohol having a silanol group, and a reactive group-modified polyvinyl alcohol having a reactive group such as an acetoacetyl group, a carbonyl group, or a carboxyl group.

These polyvinyl alcohols may be used singly, or polyvinyl alcohols having different polymerization degrees or modification types, for example, may be used in combination. A commercially available product or a synthetic product may be used for the polyvinyl alcohols. Examples of the commercially available product include POVAL (registered trademark, manufactured by Kuraray Co., Ltd.) such as PVA-102, PVA-103, PVA-105, PVA-110, PVA-117, PVA-120, PVA-124, PVA-135, PVA-203, PVA-205, PVA-210, PVA-217, PVA-220, PVA-224, or PVA-235, EXCEVAL (registered trademark, manufactured by Kuraray Co., Ltd.), NICHIGO G polymer (registered trademark, manufactured by Synthetic Chemical Industry Co., Ltd.).

The content of a polyvinyl alcohol in the refractive index layer is preferably 3 to 70% by mass, more preferably 5 to 60% by mass, still more preferably 10 to 50% by mass, and particularly preferably 13 to 45% by mass with respect to the total solid content of the refractive index layer.

(Curing Agent)

In the present invention, a curing agent is preferably used in the refractive index layer. In a case where a polyvinyl alcohol is used as the resin, an effect thereof can be particularly exhibited.

The curing agent that can be used together with a polyvinyl alcohol is not particularly limited as long as causing a curing reaction with the polyvinyl alcohol, but boric acid and a salt thereof are preferable. Boric acid and a salt thereof refer to an oxygen acid having a boron atom as a central atom and a salt thereof, and specific examples thereof include orthoboric acid, diboric acid, metaboric acid, tetraboric acid, pentaboric acid, octaboric acid, and salts thereof. Boric acid and a borate as the curing agent may be used as a single aqueous solution or as a mixture of two or more kinds thereof. In the present invention, in a case where boric acid and/or a salt thereof is used, a hydrogen bond network is formed between metal oxide particles such as zirconium oxide particles and an OH group of a polyvinyl alcohol. As a result, interlayer mixing between the high refractive index layer and the low refractive index layer is suppressed, and it is considered that preferable optical reflection characteristics are achieved. Particularly, in a case of using a set type coating process for applying a multilayer of the high refractive index layer and the low refractive index layer with a coater, then lowering a film surface temperature of the coating film to about 15° C. once, and then drying the film surface, a more preferable effect can be exhibited.

As the curing agent, in addition to the above boric acid and a salt thereof, a known compound can be used. In general, a compound having a group capable of reacting with a polyvinyl alcohol or a compound promoting a reaction between different groups possessed by a polyvinyl alcohol is used. A compound is appropriately selected to be used. Specific examples of the curing agent include an epoxy-based curing agent (diglycidyl ethyl ether, ethylene glycol diglycidyl ether, 1,4-butanediol diglycidyl ether, 1,6-diglycidyl cyclohexane, N,N-diglycidyl-4-glycidyloxyaniline, sorbitol polyglycidyl ether, glycerol polyglycidyl ether, or the like), an aldehyde-based curing agent (formaldehyde, glyoxal, or the like), an active halogen-based curing agent (2,4-dichloro-4-hydroxy-1,3,5,-s-triazine, or the like), an active vinyl-based compound (1,3,5-trisacryloyl-hexahydro-s-triazine, bisvinylsulfonyl methyl ether, or the like), and aluminum alum.

The total use amount of the curing agent is preferably 10 to 600 mg, and more preferably 20 to 500 mg per g of a polyvinyl alcohol (in a case where a plurality of polyvinyl alcohols is used, the total amount thereof).

(Surfactant)

The high refractive index layer and the low refractive index layer according to the present invention preferably each contain a surfactant from a viewpoint of coatability.

Examples of a surfactant used for adjusting surface tension at the time of coating include an anionic surfactant, a nonionic surfactant, and an amphoteric surfactant, and the amphoteric surfactant is more preferable.

Examples of the amphoteric surfactant preferably used in the present invention include an amidosulfobetaine type, a carboxybetaine type, a sulfobetaine type, and an imidazolium type. Specific examples of the amphoteric surfactant preferably used in the present invention are illustrated below. In the present invention, the sulfobetaine type and the carboxybetaine type are preferable from a viewpoint of coating unevenness, and examples of products thereof include LSB-R, LSB, and LMEB-R (manufactured by Kawaken Fine Chemical Co., Ltd.) and Anhithol 20HD (manufactured by Kao Corporation).

The content of the surfactant in the refractive index layer according to the present invention is preferably 0.001 to 1% by mass, and more preferably 0.005 to 0.50% by mass with respect to the total solid content of the refractive index layer.

(Emulsion Resin)

In the present invention, the refractive index layer may contain an emulsion resin. By using an emulsion resin in a coating liquid obtained by dispersing metal oxide particles, a water-soluble resin, and a surfactant added as necessary in an aqueous solvent, structural viscosity of the coating liquid is stabilized, and a dispersion state is good. It is considered that an increase in viscosity is suppressed. As a result, a problem of a coating film failure is solved, and a product yield can be largely improved.

As the emulsion resin, any of an anionic emulsion resin, a cationic emulsion resin other than the above cationic polymer, and a nonionic emulsion resin can be used.

A commercially available emulsion resin may also be used, and examples thereof include Mowinyl 718A, 710A, 731A, LDM 7582, 5450, and 6960 (manufactured by Nippon Synthetic Chemical Industry Co., Ltd.), Superflex (registered trademark) 150, 170, 300, 500M, 620, and 650 (manufactured by First Industrial Pharmaceutical Co., Ltd.), Adeka Bontiter HUX-232, HUX-380, HUX-386, HUX-830, and HUX-895 (manufactured by ADEKA Corporation), AE-116, AE-120A, AE-200A, AE-336B, AE-981A, and AE-986B (manufactured by ETEC Corporation), ETERNA-COLLUW-1005E, UW-5002, UW-5034E, and UE-5502 (manufactured by Ube Industries, Ltd.), and ACRIT UW-309, UW-319SX, and UW-520 (manufactured by Taisei Fine Chemical Co., Ltd.).

The particle diameter of the emulsion resin is not particularly limited, but the average particle diameter thereof is preferably 1 to 100 nm, and more preferably 5 to 60 nm. By the above average particle diameter of the emulsion resin, the haze of an obtained optical reflection film is reduced, and transparency can be improved. The average particle diameter of the emulsion resin can be measured by a dynamic light scattering method.

The refractive index of the emulsion resin is not particularly limited but is preferably 1.3 to 1.7, and more preferably 1.4 to 1.6. Within the above range, the refractive index of the emulsion resin is close to that of the water-soluble resin. Therefore, the haze of an obtained optical reflection film can be reduced.

The above emulsion resin has a glass transition temperature (Tg) preferably of 20° C. or lower, more preferably of −30 to 10° C. from a viewpoint of enhancing flexibility.

The content of the emulsion resin is preferably 1 to 50% by mass (solid content mass), and more preferably 1 to 25% by mass (solid content mass (solid content mass)) with respect to the total mass (solid content mass) of the refractive index layer containing the emulsion resin.

(Other Additives)

The high refractive index layer or the low refractive index layer according to the present invention may contain various known additives such as UV absorbers described in JP 57-74193 A, JP 57-87988 A, and JP 62-261476 A, anti-fading agents described in JP 57-74192 A, JP 57-87989 A, JP 60-72785 A, JP 61-146591 A, JP 1-95091 A, and JP 3-13376 A, fluorescent whitening agents described in JP 59-42993 A, JP 59-52689 A, JP 62-280069 A, JP 61-242871 A, and JP 4-219266 A, a pH regulator such as sulfuric acid, phosphoric acid, acetic acid, citric acid, sodium hydroxide, potassium hydroxide, or potassium carbonate, an antifoaming agent, a lubricant such as diethylene glycol, a preservative, an antistatic agent, and a matting agent.

(Zirconium Oxide Particles Used for High Refractive Index Layer)

In the optical reflection film of the present invention, the high refractive index layer contains zirconium oxide particles. The high refractive index layer containing zirconium oxide particles is transparent and can exhibit a higher refractive index. In addition, light resistance and weather resistance of the high refractive index layer and an adjacent low refractive index layer are increased due to low photo catalytic activity. Incidentally, in the present invention, zirconium oxide means zirconium dioxide ($ZrO_2$).

The zirconium oxide particles may be cubic, tetragonal, or a mixture thereof.

The size of each of the zirconium oxide particles contained in the high refractive index layer is not particularly limited but can be determined from a volume average particle diameter or a primary average particle diameter. The volume average particle diameter of the zirconium oxide particles used in the high refractive index layer is preferably 100 nm or less, more preferably 1 to 100 nm, and still more preferably 2 to 50 nm. The primary average particle diameter of the zirconium oxide particles used in the high refractive index layer is preferably 100 nm or less, more preferably 1 to 100 nm, and still more preferably 2 to 50 nm. A case where the volume average particle diameter or the primary average particle diameter is 1 nm or more and 100 nm or less is preferable from a viewpoint of low haze and excellent visible light transmission.

Note that the volume average particle diameter referred to here is an average particle diameter determined by measuring particle diameters of any 1,000 particles by a method for observing the particles themselves by a laser diffraction scattering method or a dynamic light scattering method or using an electron microscope, or a method for observing a particle image appearing on a cross section or a surface of a refractive index layer using an electron microscope, and weighing the particle diameters by a volume represented by a volume average particle diameter $mv=\{\Sigma(vi \cdot di)\}/\{\Sigma(vi)\}$ if the volume per particle is represented by vi in a group of particles including n1, n2, . . . ni, . . . nk particles having particle diameters of d1, d2, . . . di, . . . dk, respectively.

In addition, here, the primary average particle diameter can be measured from an electron microscopic photograph with a transmission electron microscope (TEM) or the like. Alternatively, the primary average particle diameter may be measured by a particle size analyzer using a dynamic light scattering method, a static light scattering method, or the like.

In a case where the primary average particle diameter is determined using a transmission electron microscope, the primary average particle diameter of particles can be determined by observing particles themselves or particles appearing on a cross section or a surface of a refractive index layer with an electron microscope, measuring particle diameters of any 1,000 particles, and calculating a simple average value (number average) thereof. Here, the particle diameter of an individual particle is represented by a diameter obtained by assuming that the particle has a circular shape equal to a projected area thereof.

As the zirconium oxide particles, particles obtained by modifying a surface of an aqueous zirconium oxide sol to be dispersible in an organic solvent or the like may be used.

As a method for preparing zirconium oxide particles or a dispersion thereof, any conventionally known method can be used. For example, as described in JP 2014-80361 A, a method for preparing a slurry of zirconium oxide particles by a reaction of a zirconium salt with an alkali in water and adding an organic acid thereto for a hydrothermal treatment can be used.

Commercially available zirconium oxide particles may be used. For example, SZR-W, SZR-CW, SZR-M, and SZR-K (all manufactured by Sakai Chemical Industry Co., Ltd.) can be preferably used.

Furthermore, the zirconium oxide particles used in the present invention are preferably monodispersed. The term "monodispersed" as used herein means that the monodispersion degree determined by the following formula is 40% or less. The monodispersion degree is more preferably 30% or less, and particularly preferably 0.1 to 20%.

[Mathematical formula 1]

$$\text{Monodispersion degree}(\%) = \frac{\text{Standard deviation determined from distribution of volume particle diameter}}{\text{Volume average particle diameter}} \times 100$$

The content of the zirconium oxide particles in the high refractive index layer is not particularly limited but is preferably 15 to 95% by mass, more preferably 20 to 90% by mass, and still more preferably 30 to 90% by mass with respect to the total solid content of the high refractive index layer. Within the above range, good optical reflection characteristics can be obtained.

(Metal Oxide Particles Used in High Refractive Index Layer)

In order to form a high refractive index layer having a higher refractive index in the optical reflection film according to the present invention, the high refractive index layer may contain, in addition to zirconium oxide particles, metal oxide particles (high refractive index metal oxide fine particles) such as titanium oxide, tin oxide, zinc oxide, alumina, colloidal alumina, niobium oxide, or europium oxide. Incidentally, in order to adjust the refractive index, the above high refractive index metal oxide fine particles other than zirconium oxide may be used singly or in combination of two or more kinds thereof. Incidentally, the size of the above high refractive index metal oxide fine particles other than zirconium oxide is not particularly limited but is preferably 1 to 100 nm or less, and more preferably 3 to 50 nm in terms of a volume average particle diameter. The primary average particle diameter is preferably 1 to 100 nm or less, and more preferably 3 to 50 nm. The content of the above high refractive index metal oxide fine particles in the high refractive index layer is not particularly limited. However, the sum of the content of zirconium oxide particles and the content of the high refractive index metal oxide fine particles is adjusted to be preferably 15 to 95% by mass, more preferably 20 to 80% by mass, and still more preferably 30 to 80% by mass with respect to the total solid content of the high refractive index layer.

Note that the content of zirconium oxide particles is preferably 80 to 100 parts by mass, more preferably 90 to 100% by mass, and still more preferably 100% by mass with respect to the total amount of the metal oxide particles used in the high refractive index layer (the total amount of zirconium oxide particles and the above high refractive index metal oxide fine particles other than zirconium oxide).

The zirconium oxide particles in the high refractive index layer only need to be contained in at least one layer of the plurality of high refractive index layers.

(Metal Oxide Particles in Low Refractive Index Layer)

In the optical reflection film of the present invention, silicon oxide (silicon dioxide) is used as metal oxide particles in the low refractive index layer. Specific examples thereof include synthetic amorphous silica, colloidal silica, zinc oxide, alumina, and colloidal alumina. Among these compounds, a colloidal silica sol, particularly an acidic colloidal silica sol is more preferably used, and a colloidal silica dispersed in an organic solvent is particularly preferably used. In order to further reduce the refractive index, hollow fine particles having pores inside the particles may be used as the metal oxide particles in the low refractive index layer, and hollow fine particles of silicon oxide (silicon dioxide) are particularly preferably used. Known metal oxide particles (inorganic oxide particles) other than silicon oxide can also be used. In order to adjust the refractive index, the metal oxide particles contained in the low refractive index layer may be used singly or in combination of two or more kinds thereof.

The silicon oxide particles contained in the low refractive index layer preferably have an average particle diameter (number average; diameter) of 3 to 100 nm. The average particle diameter of primary particles of silicon dioxide dispersed in a state of primary particles (particle diameter in a state of dispersion before coating) is more preferably 3 to 50 nm, still more preferably 1 to 40 nm, particularly preferably 3 to 20 nm, and most preferably 4 to 10 nm. The average particle diameter of the secondary particles is preferably 30 nm or less from a viewpoint of low haze and excellent visible light transmission.

In addition to the primary average particle diameter, the particle diameter of the silicon oxide particles contained in the low refractive index layer can also be determined from a volume average particle diameter.

The colloidal silica used in the present invention is obtained by heating and aging a silica sol obtained by double decomposition of sodium silicate with an acid or the like or causing sodium silicate to pass through an ion exchange resin layer, and is described, for example, in JP 57 14091 A, JP 60-219083 A, JP 60-219084 A, JP 61-20792 A, JP 61-188183 A, JP 63-17807 A, JP 4-93284 A, JP 5-278324 A, JP 6-92011 A, JP 6-183134 A, JP 6-297830 A, JP 7-81214 A, JP 7-101142 A, JP 7-179029 A, JP 7-137431 A, and WO 94/26530 A.

As the colloidal silica, a synthetic product or a commercially available product may be used. Examples of the commercially available product include Snowtex series (Snowtex OS, OXS, S, OS, 20, 30, 40, O, N, C, and the like) sold by Nissan Chemical Industries.

A surface of the colloidal silica may be cationically modified or may be treated with Al, Ca, Mg, Ba, or the like.

Hollow particles can also be used as the silicon oxide particles in the low refractive index layer as described above. In a case where hollow fine particles are used, the average particle pore diameter is preferably 3 to 70 nm, more preferably 5 to 50 nm, and still more preferably 5 to 45 nm. Note that the average particle pore diameter of the hollow fine particles is an average value of inner diameters of the hollow fine particles. If the average particle pore diameter of the hollow fine particles is within the above range, the refractive index of the low refractive index layer is sufficiently lowered. The average particle pore diameter is obtained by randomly observing 50 or more pore diameters each observable as a circle, an ellipse, or a substantial circle or ellipse by observation with an electron microscope, determining the pore diameters of the particles, and calculating a number average value thereof. Note that the average particle pore diameter means a minimum distance among distances obtained by sandwiching an outer edge of a pore diameter observable as a circle, an ellipse, or a substantial circle or ellipse between two parallel lines.

The content of silicon oxide particles in the low refractive index layer is preferably 20 to 90% by mass, more preferably 30 to 85% by mass, and still more preferably 40 to 80% by mass with respect to the total solid content of the low refractive index layer. A case where the content is 20% by mass or more is preferable because a desired refractive index is obtained. A case where the content is 90% by mass or less is preferable because coatability is good.

The silicon oxide particles and the two or more cationic polymers in the low refractive index layer only need to be contained in at least one of the plurality of low refractive index layers.

(Substrate)

The optical reflection film according to the present invention includes a substrate for supporting the high refractive index layer and the low refractive index layer. As the substrate of the optical reflection film, various resin films can be used, and examples thereof include a polyolefin film (polyethylene, polypropylene, or the like), a polyester film (polyethylene terephthalate (PET), polyethylene naphthalate, or the like), polyvinyl chloride, and cellulose triacetate, and a polyester film is preferable. The polyester film (hereinafter, referred to as "polyester") is not particularly limited but is preferably a polyester containing a dicarboxylic acid component and a diol component as main constituent components and having a film-forming property.

Examples of the dicarboxylic acid component as a main constituent component include terephthalic acid, isophthalic acid, phthalic acid, 2,6-naphthalene dicarboxylic acid, 2,7-naphthalene dicarboxylic acid, diphenyl sulfone dicarboxylic acid, diphenyl ether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, and phenyl indane dicarboxylic acid. Examples of the diol component include ethylene glycol, propylene glycol, tetramethylene glycol, cyclohexane dimethanol, 2,2-bis(4-hydroxyphenyl) propane, 2,2-bis(4-hydroxyethoxyphenyl) propane, bis(4-hydroxyphenyl) sulfone, bisphenol fluorene dihydroxyethyl ether, diethylene glycol, neopentyl glycol, hydroquinone, and cyclohexane diol. Among polyesters containing these compounds as main constituent components, a polyester containing terephthalic acid or 2,6-naphthalene dicarboxylic acid as a dicarboxylic acid component serving as a main constituent component, and containing ethylene glycol or 1,4-cyclohexanedimethanol as a diol component serving as a main constituent component is preferable from viewpoints of transparency, mechanical strength, dimensional stability, and the like. Among the polyesters, a polyester containing polyethylene terephthalate or polyethylene naphthalate as a main constituent component, a copolymerized polyester formed of terephthalic acid, 2,6-naphthalene dicarboxylic acid, and ethylene glycol, and a polyester containing a mixture of two or more of these polyesters as a main constituent component are preferable.

The thickness of the substrate used in the present invention is preferably 10 to 300 µm, and particularly preferably 20 to 150 µm. The substrate may be obtained by laminating two or more substrates, and in this case, the kinds thereof may be the same as or different from each other.

The substrate has a transmittance preferably of 85% or more, particularly preferably of 90% or more in a visible light region specified in JIS R3106 (1998). The above transmittance or more of the substrate is advantageous and preferable from a viewpoint that the transmittance in a visible light region specified in JIS R3106 (1998) is set to 50% or more (upper limit: 100%) when an infrared shielding film is formed.

The substrate using the above resin or the like may be an unstretched film or a stretched film. A stretched film is preferable from viewpoints of improvement in strength and suppression of thermal expansion.

The substrate can be manufactured by a conventionally known general method. For example, an unstretched substrate which is substantially amorphous and unoriented can be manufactured by melting a resin as a material with an extruder, extruding the resin with a circular die or a T-die, and rapidly cooling the resin. In addition, a stretched substrate can be manufactured by stretching an unstretched substrate in a flow (longitudinal axis) direction of the substrate or in a (transverse axis) direction perpendicular to the flow direction of the substrate by a known method such as uniaxial stretching, tenter type sequential biaxial stretching, tenter type simultaneous biaxial stretching, or tubular type simultaneous biaxial stretching. In this case, the stretching magnification can be appropriately selected according to a resin as a raw material of the substrate but is preferably 2 to 10 times in each of the longitudinal axis direction and the transverse axis direction.

In addition, the substrate may be subjected to a relaxation treatment and an offline heat treatment from a viewpoint of dimensional stability. The relaxation treatment is preferably performed in a step after heat setting is performed in a step of stretching and forming the polyester film and before the polyester film is wound in a tenter for lateral stretching or after the polyester film leaves the tenter. The relaxation treatment is performed preferably at a treatment temperature of 80 to 200° C., and more preferably at a treatment temperature of 100 to 180° C. In addition, in both the longitudinal direction and the transverse direction, the relaxation treatment is performed at a relaxation ratio of preferably in a range of 0.1 to 10%, more preferably in a range of 2 to 6%. The relaxed substrate is subjected to the following off-line heat treatment, and thereby has better heat resistance and better dimensional stability.

An undercoat layer coating liquid is preferably applied onto one surface or both surfaces of the substrate in-line in a film forming process. Note that undercoating in the film forming step is referred to as in-line undercoating. Examples of a resin used for the undercoat layer coating liquid include a polyester resin, an acrylic modified polyester resin, a polyurethane resin, an acrylic resin, a vinyl resin, a vinylidene chloride resin, a polyethyleneimine vinylidene resin, a polyethyleneimine resin, a polyvinyl alcohol resin (polyvinyl alcohol), a modified polyvinyl alcohol resin (modified polyvinyl alcohol), and gelatin, and any of these resins can be preferably used. A conventionally known additive can be added to these undercoat layers. The above undercoat layers can be coated by a known method such as roll coating, gravure coating, knife coating, dip coating, spray coating, or the like. The coating amount of the above undercoat layer is preferably about from 0.01 to 2 $g/m^2$ (dry state).

Note that the substrate can contain, as the additive, for example, a stabilizer, a surfactant, an infrared absorber, an ultraviolet absorber, a flame retardant, an antistatic agent, an antioxidant, a thermal stabilizer, a lubricant, a filler, a coloring agent, a dye, and an adhesion regulator.

[Method for Manufacturing Optical Reflection Film]

As a method for manufacturing the optical reflection film of the present invention, any method can be used as long as at least one unit including the high refractive index layer and the low refractive index layer can be formed on a substrate.

In the method for manufacturing the optical reflection film of the present invention, the optical reflection film is formed by laminating a unit including a high refractive index layer and a low refractive index layer on a substrate.

Specifically, a high refractive index layer and a low refractive index layer are preferably alternately applied and dried to form a laminate. Specific examples thereof include: (1) a method for applying and drying a high refractive index layer coating liquid on a substrate to form a high refractive index layer, and then applying and drying a low refractive index layer coating liquid thereon to form a low refractive index layer, thereby forming an optical reflection film; (2) a method for applying and drying a low refractive index layer coating liquid on a substrate to form a low refractive index layer, and then applying and drying a high refractive index layer coating liquid thereon to form a high refractive index layer, thereby forming an optical reflection film; (3) a method for applying a high refractive index layer coating liquid and a low refractive index layer coating liquid onto a substrate alternately and sequentially in a multilayer manner, and then drying the high refractive index layer coating liquid and the low refractive index layer coating liquid to form an optical reflection film including the high refractive index layer and the low refractive index layer; and (4) a method for applying a high refractive index layer coating liquid and a low refractive index layer coating liquid onto a substrate simultaneously in a multilayer manner, and then drying the high refractive index layer coating liquid and the low refractive index layer coating liquid to form an optical reflection film including the high refractive index layer and the low refractive index layer. Among these methods, the method (4) which is a simpler manufacturing process is preferable. That is, the method for manufacturing the optical reflection film of the present invention preferably includes laminating the high refractive index layer and the low refractive index layer by an aqueous simultaneous multilayer coating method.

Preferable examples of the coating method include a roll coating method, a rod bar coating method, an air knife coating method, a spray coating method, a curtain coating method, and a slide bead coating method and an extrusion coating method described in U.S. Pat. Nos. 2,761,419 and 2,761,791.

A solvent for preparing the high refractive index layer coating liquid and the low refractive index layer coating liquid is not particularly limited, but water, an organic solvent, or a mixed solvent thereof is preferable. In the present invention, polyvinyl alcohol is preferably used mainly as a resin. In this way, use of polyvinyl alcohol makes coating with an aqueous solvent possible. Furthermore, in the present invention, in order to reduce haze and to suppress cracking, two or more cationic polymers are added to the low refractive index layer coating liquid, and these cationic polymers also preferably have high water-solubility. Compared with a case of using an organic solvent, the aqueous solvent is preferable from a viewpoint of productivity because of requiring no large-scale manufacturing equipment, and is also preferable from a viewpoint of environmental protection.

Examples of the organic solvent include an alcohol such as methanol or ethanol, an ester such as ethyl acetate, butyl acetate, or propylene glycol monomethyl ether acetate, an ether such as diethyl ether or propylene glycol monomethyl ether, an amide such as dimethylformamide, and a ketone such as acetone or methyl ethyl ketone. These organic solvents may be used singly or in combination of two or more kinds thereof. The solvent of the coating liquid is preferably an aqueous solvent, more preferably water or a mixed solvent of water and methanol, ethanol, or ethyl acetate, and particularly preferably water from a viewpoint of environment, ease of operation, or the like.

When a mixed solvent of water and a small amount of organic solvent is used, the content of water in the mixed solvent is preferably 80 to 99.9% by mass, and more preferably 85 to 99.5% by mass with respect to 100% by mass of the total mass of the mixed solvent. Here, this is because volume fluctuation due to volatilization of a solvent can be reduced, and handling is improved by setting the content of water to 80% by mass or more, and homogeneity upon addition of a liquid is increased, and stable liquid physical properties can be obtained by setting the content of water to 99.9% by mass or less.

The concentration of a resin in the high refractive index layer coating liquid (in a case where a plurality of resins is used, the total concentration thereof) is preferably 0.5 to 10% by mass. The total concentration of zirconium oxide-containing metal oxide particles in the high refractive index layer coating liquid is preferably 1 to 50% by mass.

The concentration of a resin in the low refractive index layer coating liquid is preferably 0.5 to 10% by mass. The total concentration of silicon oxide particles-containing metal oxide particles in the low refractive index layer coating liquid is preferably 1 to 50% by mass. The content of each of two or more cationic polymers in the low refractive index layer coating liquid is, for example, 0.5 to 20% by mass, preferably 2 to 20% by mass, more preferably 3 to 10% by mass, still more preferably 1 to 10% by mass, and further still more preferably 2 to 5% by mass with respect to the total mass of the silicon oxide particles-containing metal oxide particles.

A method for preparing the high refractive index layer coating liquid is not particularly limited, and examples thereof include a method for adding zirconium oxide particles-containing metal oxide particles, polyvinyl alcohol, and other additives added as necessary, and stirring and mixing these components. At this time, the order of adding the components is not particularly limited. The components may be sequentially added and mixed while being stirred or may be added at once and mixed while being stirred.

A method for preparing the low refractive index layer coating liquid is not particularly limited, and examples thereof include a method for adding silicon oxide particles-containing metal oxide particles, polyvinyl alcohol, two or more cationic polymers, and other additives added as necessary, and stirring and mixing these components. At this time, the order of adding the components is not particularly limited. The components may be sequentially added and mixed while being stirred or may be added at once and mixed while being stirred.

In the present invention, in a case where simultaneous multilayer coating is performed, the saponification degree of polyvinyl alcohol used for the high refractive index layer coating liquid is preferably different from that for the low refractive index layer coating liquid. By using polyvinyl alcohols with different saponification degrees, mixing of layers can be suppressed in each of coating and drying steps. Although this mechanism has not been clarified yet, it is considered that mixing is suppressed by a difference in surface tension derived from the difference in saponification degree. In the present invention, the difference in saponification degree of polyvinyl alcohol between the high refractive index layer coating liquid and the low refractive index layer coating liquid is preferably 3% by mol or more, and more preferably 8% by mol or more. That is, the difference in saponification degree between the high refractive index layer and the low refractive index layer is preferably 3% by mol or more, and more preferably 8% by mol or more. An upper limit of the difference in saponification degree between the high refractive index layer and the low refractive index layer is preferably as high as possible in consideration of a suppression/prevention effect of interlayer mixing between the high refractive index layer and the low refractive index layer, and therefore is not particularly limited, but is preferably 20% by mol or less, and more preferably 15% by mol or less.

When a difference in saponification degree is compared among refractive index layers, in a case where each refractive index layer contains a plurality of polyvinyl alcohols (having different saponification degrees and polymerization degrees), comparison is made with the saponification degree of a polyvinyl alcohol having the largest content in the refractive index layer. Here, when the phrase "a polyvinyl alcohol having the largest content in the refractive index layer" is used, polyvinyl alcohols having a difference in saponification degree of 3% by mol or less are assumed to be the same polyvinyl alcohol, and the polymerization degree is calculated. Specifically, in a case where polyvinyl alcohols having a saponification degree of 90% by mol, a saponification degree of 91% by mol, and a saponification degree of 93% by mol are contained in the same layer at 10% by mass, 40% by mass, and 50% by mass, respectively, these three polyvinyl alcohols are assumed to be the same polyvinyl alcohol, and a mixture of these three polyvinyl alcohols is referred to as polyvinyl alcohol (A) or (B). The saponification degree of this polyvinyl alcohol (A)/(B) is (90×0.1+91×0.4+93×0.5)/1=91.9% by mol. The phrase "polyvinyl alcohols having a difference in saponification degree of 3% by mol or less" is sufficient if the difference is within 3% by mol when attention is paid to any polyvinyl alcohol. For example, in a case where polyvinyl alcohols of 90, 91, 92, and 94% by mol are contained, when attention is paid to a polyvinyl alcohol of 91% by mol, a difference in saponification degree from any other polyvinyl alcohol is within 3% by mol, and therefore these polyvinyl alcohols are the same polyvinyl alcohol.

In a case where polyvinyl alcohols having a difference in saponification degree of 3% by mol or more from each other are contained in the same layer, the polyvinyl alcohols are assumed to be a mixture of different polyvinyl alcohols, and the polymerization degree and the saponification degree are calculated for each of the polyvinyl alcohols.

For example, in a case where PVA 203: 5% by mass, PVA 117: 25% by mass, PVA 217: 10% by mass, PVA 220: 10% by mass, PVA 224: 10% by mass, PVA 235: 20% by mass, and PVA 245: 20% by mass are contained, PVA having the largest content is a mixture of PVAs 217 to 245 (a difference in saponification degree among PVAs 217 to 245 is 3% by mol or less, and therefore the PVAs 217 to 245 are the same polyvinyl alcohol), and this mixture is polyvinyl alcohol (A) or (B). In the mixture of PVAs 217 to 245 (polyvinyl alcohol (A)/(B)), the polymerization degree is (1700×0.1+2000× 0.1+2400×0.1+3500×0.2+4500×0.2)/0.7=3200, and the saponification degree is 88% by mol.

In a case of using a slide bead coating method, the temperature of each of the high refractive index layer coating liquid and the low refractive index layer coating liquid for simultaneous multilayer coating is preferably in a temperature range of 25 to 60° C., and more preferably in a temperature range of 30 to 45° C. In a case of using a curtain coating method, the temperature range is preferably 25 to 60° C., and more preferably 30 to 45° C.

The viscosity of each of the high refractive index layer coating liquid and the low refractive index layer coating liquid for simultaneous multilayer coating is not particularly limited. However, in a case of using the slide bead coating method, the viscosity is preferably in a range of 5 to 160 mPa·s, and more preferably in a range of 60 to 140 mPa·s in the above preferable temperature range of the coating liquids. In a case of using the curtain coating method, the viscosity is preferably in a range of 5 to 1200 mPa·s, and more preferably in a range of 25 to 500 mPa·s in the above preferable temperature range of the coating liquids. Within such a range of viscosity, simultaneous multilayer coating can be performed efficiently.

The viscosity of the coating liquid at 15° C. is preferably 100 mPa·s or more, more preferably 100 to 30,000 mPa·s, and still more preferably 2,500 to 30,000 mPa·s.

Conditions for coating and drying methods are not particularly limited. However, for example, in a case of a sequential coating method, first, one of the high refractive index layer coating liquid and the low refractive index layer coating liquid heated to 30 to 60° C. is applied onto a substrate and dried to form a layer. Thereafter, the other coating liquid is applied onto this layer and dried to form a laminated film precursor (unit). Subsequently, the number of units required to develop desired shielding performance is sequentially applied by the above method, dried, and laminated to obtain a laminated film precursor. In drying, the formed coating film is preferably dried at 30° C. or higher. For example, the coating film is preferably dried in a range of a wet-bulb temperature of 5 to 50° C. and a film surface temperature of 5 to 100° C. (preferably 10 to 50° C.). For example, hot air of 40 to 60° C. is blown against the coating film for 1 to 5 seconds for drying. Examples of a drying method include hot air drying, infrared drying, and microwave drying. Drying in a multistage process is more preferable than drying in a single process. It is more preferable to set the temperature of a constant rate drying portion so as to be lower than the temperature of a decreasing rate drying portion. In this case, the temperature range of the constant rate drying portion is preferably 30 to 60° C., and the temperature range of the decreasing rate drying portion is preferably 50 to 100° C.

Conditions for coating and drying methods in a case of performing simultaneous multilayer coating are as follows. That is, the high refractive index layer coating liquid and the low refractive index layer coating liquid are heated to 30 to 60° C. to apply the high refractive index layer coating liquid and the low refractive index layer coating liquid simultaneously onto a substrate in a multilayer manner, then the temperature of the formed coating film is preferably decreased (set) to 1 to 15° C. once, and then the coating film is preferably dried at 10° C. or higher. More preferable drying conditions are a wet bulb temperature of 5 to 50° C. and a film surface temperature of 10 to 50° C. For example, hot air of 40 to 80° C. is blown against the coating film for 1 to 5 seconds for drying. As a cooling method immediately after coating, a horizontal set method is preferable from a viewpoint of improving uniformity of a formed coating film.

Here, the term "set" means a step for increasing the viscosity of a coating film composition, lowering the fluidity of a substance between layers and in each of the layer, or gelating the coating film composition by a means of lowering the temperature by applying cold air or the like to the coating film. A state in which cold air is applied to a surface of the coating film, the finger is pressed against the surface of the coating film, and nothing is attached to the finger is defined as a set completion state.

From the time of coating to completion of the set by applying cold air (set time) is preferably within 5 minutes, and more preferably within 2 minutes. A lower limit of the time is not particularly limited, but it is preferable to set 45 seconds or more. If the set time is too short, mixing of the components in a layer may be insufficient. Meanwhile, if the set time is too long, interlayer diffusion of metal oxide particles progresses, and a difference in refractive index between the high refractive index layer and the low refractive index layer may be insufficient.

The set time can be adjusted by adjusting the concentration of polyvinyl alcohol or the concentration of metal oxide particles, or by adding other components such as various known gelling agents such as gelatin, pectin, agar, carrageenan, and gellan gum.

The temperature of the cold air is preferably 0 to 25° C., and more preferably 5 to 10° C. Time for which the coating film is exposed to cold air is preferably 10 to 360 seconds, more preferably 10 to 300 seconds, and still more preferably 10 to 120 seconds, although depending on a transportation speed of the coating film.

Coating only needs to be performed such that the coating thickness of each of the high refractive index layer coating liquid and the low refractive index layer coating liquid is the preferable dry thickness as described above.

[Film Design]

The optical reflection film of the present invention includes at least one unit formed by laminating a high refractive index layer and a low refractive index layer. The optical reflection film preferably includes a multilayer optical interference film formed by alternately laminating a high refractive index layer and a low refractive index layer on one surface or both surfaces of a substrate. A preferable range of the total number of a high refractive index layer and a low refractive index layer per surface of the substrate is 100 layers or less, and more preferably 45 layers or less from a viewpoint of productivity. A lower limit of the range of the total number of a high refractive index layer and a low refractive index layer per surface of the substrate is not particularly limited but is preferably 5 or more.

Note that the above preferable range of the total number of a high refractive index layer and a low refractive index layer can be applied also to a case where lamination is performed only on one surface of a substrate and also to a case where lamination is simultaneously performed on both surfaces of the substrate. In a case where lamination is performed on both surfaces of a substrate, the total number of a high refractive index layer and a low refractive index layer on one surface of the substrate may be the same as or different from that of the other surface. In the optical reflection film of the present invention, a lowermost layer (layer in contact with the substrate) and an outermost layer may be either a high refractive index layer or a low refractive index layer.

Generally, the optical reflection film is preferably designed so as to have a large difference in refractive index between a high refractive index layer and a low refractive index layer from a viewpoint that a reflectance to a desired ray of light can be increased with a small number of layers. In the present invention, a difference in refractive index between at least two adjacent layers (high refractive index layer and low refractive index layer) is preferably 0.15 or more, more preferably 0.2 or more, and most preferably 0.21 or more. An upper limit thereof is not particularly limited but is generally 0.5 or less.

The difference in refractive index and the required number of layers can be calculated using a commercially available optical design software. For example, in order to obtain a near-infrared reflectance of 90% or more, if the difference in refractive index is smaller than 0.1, it is necessary to laminate 200 layers or more. This not only reduces productivity but also increases scattering at a lamination interface to reduce transparency, and may make manufacturing without trouble very difficult.

In a case where the optical interference film is formed by alternately laminating a high refractive index layer and a low refractive index layer, the difference in refractive index between the high refractive index layer and the low refractive index layer is preferably within the above preferable range of the difference in refractive index. However, for example, in a case where an outermost layer is formed as a layer for protecting a film or in a case where a lowermost layer is formed as an adhesiveness improving layer with a substrate, each of the outermost layer and the lowermost layer may have a configuration outside the above preferable range of the difference in refractive index.

Reflection at an adjacent layer interface (interface between a high refractive index layer and a low refractive index layer) depends on a refractive index ratio between the layers. Therefore, the reflectance increases as the refractive index ratio increases. If a difference in optical path between reflected light on a surface of a layer and reflected light at a bottom of the layer is expressed by n·d=wavelength/4 when viewed in a monolayer film, the reflected light can be controlled so as to be intensified by a difference in phase, and the reflectance can be increased. Here, n represents a refractive index, d represents a physical film thickness of a layer, and n·d represents an optical film thickness. Reflection can be controlled by utilizing this difference in optical path. By utilizing this relationship, the refractive index and film thickness of each layer are controlled, and reflection of visible light and near-infrared light is controlled. That is, a reflectance in a specific wavelength region can be increased according to the refractive index of each layer, the film thickness of each layer, and a method for laminating layers.

The optical reflection film of the present invention can be a visible light reflection film or a near-infrared reflection film by changing a specific wavelength region for increasing a reflectance. That is, if the specific wavelength region for increasing a reflectance is set in a visible light region, the optical reflection film becomes a visible light reflection film, and if the specific wavelength region is set in a near-infrared region, the optical reflection becomes a near-infrared reflection film. If the specific wavelength region for increasing a reflectance is set in an ultraviolet region, the optical reflection becomes an ultraviolet reflection film. In a case where the optical reflection film of the present invention is used for a heat-shielding film, the optical reflection film only needs to be a (near) infrared reflection (shielding) film. In a case of an infrared reflection film, a multilayer film is formed by laminating films having different refractive indices on a polymer film. Transmittance at 550 nm in a visible light region indicated by JIS R3106 (1998) is preferably 50% or more, more preferably 70% or more, and still more preferably 75% or more. Transmittance at 1200 nm is preferably 35% or less, more preferably 25% or less, and still more preferably 20% or less. The optical film thickness and the unit are preferably designed such that the transmittance is within such a preferable range. A range of wavelengths 900 nm to 1400 nm preferably includes a region having a reflectance of more than 50%.

In an incident spectrum of direct sunlight, light in an infrared region relates to rise in room temperature. By shielding this light, the rise in room temperature can be suppressed. If a cumulative energy ratio from the shortest infrared wavelength (760 nm) to the longest infrared wavelength 3200 nm is referred to based on a heavy coefficient described in Japanese Industrial Standard JIS R3106 (1998), when cumulative energy from 760 nm to each wavelength is calculated assuming that the total energy of the entire infrared region from wavelength 760 nm to the longest wavelength 3200 nm is 100, the total energy of 760 to 1300 nm occupies about 75% of the entire infrared region. Therefore, shielding light in a wavelength region up to 1300 nm is efficient for energy saving by heat ray shielding.

If the reflectance in this near-infrared region (760 to 1300 nm) is set to about 80% or more in terms of a maximum peak value, a decrease in sensible temperature is obtained by sensory evaluation. For example, there was a clear difference in the sensible temperature at a window side facing the southeast direction in the morning of August when the reflectance in a near-infrared region was shielded to about 80% in terms of a maximum peak value.

A multilayer film structure required for developing such a function was determined using an optical simulation (FTG Software Associates Film DESIGN Version 2.23.3700). As a result, it has been found that excellent characteristics are obtained in a case where 22 or more layers are laminated using a high refractive index layer of 1.7 or more, desirably 1.73 or more. For example, a simulation result of a model in which 22 high refractive index and low refractive index layers (refractive index=1.45) are alternately laminated indicates that a reflectance does not reach 30% in a case where the refractive index of the high refractive index layer is 1.6 but a reflectance of about 60% is obtained in a case where the refractive index is 1.7.

The low refractive index layer has a refractive index preferably of 1.10 to 1.60, more preferably of 1.30 to 1.50. The high refractive index layer has a refractive index preferably of 1.65 to 1.8, more preferably of 1.7 to 1.75.

The thickness (thickness after drying) of each of the refractive index layers (excluding a lowermost layer and an outermost layer) is preferably 20 to 1000 nm, more preferably 50 to 500 nm, and still more preferably 50 to 350 nm.

The total thickness (including a substrate) of the optical reflection film of the present invention is preferably 12 to 315 μm, more preferably 15 to 200 and still more preferably 20 to 100 μm.

In order to further improve optical characteristics, the haze of the optical reflection film is preferably as small as possible, and more preferably 0 to 1.5%. Cracking after exposure is preferably suppressed from a viewpoint of durability. Note that the haze means a value measured by a method of Examples.

[Layer Configuration of Optical Reflection Film]

The optical reflection film includes at least one unit formed by laminating a high refractive index layer and a low refractive index layer on a substrate. The unit may be formed on only one surface of the substrate or on both surfaces thereof. The unit is preferably formed on both surfaces of the substrate because a reflectance of light with a specific wavelength is improved.

In order to further impart a function, the optical reflection film may include, under a substrate or on an outermost surface opposite to the substrate, at least one functional layer such as a conductive layer, an antistatic layer, a gas barrier layer, an easy adhesion layer (adhesive layer), an antifouling layer, a deodorant layer, an anti-sticking, a slippery layer, a hard coat layer, a wear resistant layer, an anti-reflection layer, an electromagnetic wave shielding layer, an ultraviolet absorbing layer, an infrared absorbing layer, a print layer, a fluorescent emitting layer, a hologram layer, a release layer, a pressure-sensitive adhesive layer, an adhesive layer, an infrared cut layer (a metal layer or a liquid crystal layer) other than the high refractive index layer and the low refractive index layer, a colored layer (visible light absorbing layer), or an intermediate film used for a laminated glass.

The laminating order of the various functional layers in the reflection film is not particularly limited.

For example, preferable examples of a specification of bonding an optical reflection film to an interior side of a window glass (inner bonding) include a form in which an optical reflection layer including at least one unit formed by laminating the high refractive index layer and the low refractive index layer and a pressure-sensitive adhesive layer are laminated in this order, and a hard coat layer is applied onto a surface of the substrate on the side opposite to the side on which these layers are laminated. The pressure-sensitive adhesive layer, the substrate, the optical reflection layer, and the hard coat layer may be laminated in this order. The optical reflection film may further include another functional layer, a substrate, an infrared absorber, or the like. Preferable examples of a specification of bonding the optical reflection film of the present invention to an exterior side of a window glass (outer bonding) include a form in which an optical reflection layer and a pressure-sensitive adhesive layer are laminated in this order, and a hard coat layer is applied onto a surface of the substrate on the side opposite to the side on which these layers are laminated. As in the case of inner bonding, the pressure-sensitive adhesive layer, the substrate, the optical reflection layer, and the hard coat layer may be laminated in this order. The optical reflection film may further include another functional layer, a substrate, an infrared absorber, or the like.

[Pressure-Sensitive Adhesive Layer]

The optical reflection film according to the present invention may include a pressure-sensitive adhesive layer. This pressure-sensitive adhesive layer is usually disposed on a surface of the optical reflection layer opposite to the substrate, and a known release paper or separator may be further disposed. The configuration of the pressure-sensitive adhesive layer is not particularly limited, and for example, any of a dry laminating agent, a wet laminating agent, a pressure-sensitive adhesive, a heat sealing agent, and a hot melt agent can be used.

Examples of the pressure-sensitive adhesive include a polyester-based pressure-sensitive adhesive, a urethane-based pressure-sensitive adhesive, a polyvinyl acetate-based pressure-sensitive adhesive, an acrylic pressure-sensitive adhesive, and a nitrile rubber.

In a case where the optical reflection film of the present invention is bonded to a window glass, a bonding method in which water is blown against the window and a pressure-sensitive adhesive layer of the optical reflection film is bond to the glass surface in a wet state, that is, a so-called water bonding method is preferably used from viewpoints of reattaching, repositioning, and the like. Therefore, an acrylic pressure-sensitive adhesive having weak adhesive strength under wet conditions in which water is present is preferably used.

The acrylic pressure-sensitive adhesive used may be either a solvent type or an emulsion type. However, the solvent type pressure-sensitive adhesive is preferable because adhesive strength or the like is easily enhanced. Among these solvent type pressure-sensitive adhesives, a solvent type pressure-sensitive adhesive obtained by solution polymerization is preferable. As a raw material for manufacturing such a solvent type acrylic pressure-sensitive adhesive by solution polymerization, examples of a main monomer as a skeleton include an acrylate such as ethyl acrylate, butyl acrylate, 2-ethylhexyl acrylate, or octyl acrylate, examples of a comonomer for improving cohesive power include vinyl acetate, acrylonitrile, styrene, and methyl methacrylate, and examples of a functional group-containing monomer for imparting stable adhesive strength and maintaining a certain degree of adhesive strength even in the presence of water include methacrylic acid, acrylic acid, itaconic acid, hydroxyethyl methacrylate, and glycidyl methacrylate. As the pressure-sensitive adhesive layer, a compound having a low glass transition temperature (Tg) such as butyl acrylate is particularly useful as a main polymer because the pressure-sensitive adhesive layer requires particularly high tackiness.

Examples of a commercially available product of the acrylic pressure-sensitive adhesives include CORPONYL (registered trademark) series (manufactured by Nippon Synthetic Chemical Industry Co., Ltd.).

This pressure-sensitive adhesive layer can contain, as an additive, for example, a stabilizer, a surfactant, an infrared absorber, an ultraviolet absorber, a flame retardant, an antistatic agent, an antioxidant, a thermal stabilizer, a lubricant, a filler, a coloring agent, a dye, and an adhesion regulator. Particularly, in a case where the optical reflection film is used for window bonding, addition of an ultraviolet absorber is effective for suppressing deterioration of the optical reflection film due to ultraviolet rays.

A method for applying a pressure-sensitive adhesive is not particularly limited, and any known method can be used. Preferable examples thereof include a bar coating method, a die coater method, a comma coating method, a gravure roll coater method, a blade coater method, a spray coater method, an air knife coating method, a dip coating method, and a transfer method. These methods can be used singly or in combination thereof. However, a roll type continuous method is preferable from viewpoints of economy and productivity. These methods appropriately make coating possible using a coating liquid in which the pressure-sensitive adhesive is dissolved or dispersed in a solvent capable of dissolving the pressure-sensitive adhesive. Known solvents can be used as the solvent.

The thickness of the pressure-sensitive adhesive layer is usually preferably in a range of about 1 to 100 μm from viewpoints of an adhesion effect, a drying speed, and the like.

Regarding the adhesive strength, peeling strength measured by a 180° peeling test described in JIS K6854 is preferably 2 to 30 N/25 mm, and more preferably 4 to 20 N/25 mm.

The pressure-sensitive adhesive layer may be formed by directly applying the pressure-sensitive adhesive to the optical reflection layer by the above coating method, or by applying the pressure-sensitive adhesive once to a release film, drying the pressure-sensitive adhesive, and then bonding the optical reflection layer thereto to transfer the pressure-sensitive adhesive. As drying conditions at this time, a residual solvent is preferably as little as possible. In order to achieve this, drying temperature and time are not specified, but drying time of 10 seconds to 5 minutes is preferably set at a temperature of 50 to 150° C.

[Hard Coat Layer]

In the optical reflection film of the present invention, a hard coat layer containing a resin cured by heat or ultraviolet rays may be laminated as a surface protective layer for enhancing scratch resistance. Preferable examples thereof include a form in which an optical reflection layer and a pressure-sensitive adhesive layer are laminated in this order on a surface of a substrate and a hard coat layer is applied onto a surface of the substrate opposite to the side on which these layers are laminated.

Examples of a curable resin used in the hard coat layer include a thermosetting resin and an ultraviolet curable resin. However, the ultraviolet curable resin is preferable because of easy molding. Among these resins, a resin having a pencil hardness of at least 2H is more preferable. Such curable resins can be used singly or in combination of two or more kinds thereof.

Examples of the ultraviolet curable resin include (meth) acrylate, urethane acrylate, polyester acrylate, epoxy acrylate, an epoxy resin, and an oxetane resin. These resins can also be used as a solvent-free resin composition.

In a case of using the ultraviolet curable resin, a photopolymerization initiator is preferably added in order to accelerate curing.

Examples of the photopolymerization initiator include an acetophenone, a benzophenone, a ketal, an anthraquinone, a thioxanthone, an azo compound, a peroxide, a 2,3-dialkyldione compound, a disulfide compound, a thiuram compound, and a fluoroamine compound. Specific examples of the photopolymerization initiator include an acetophenone such as 2,2'-diethoxyacetophenone, p-dimethylacetophenone, 1-hydroxycyclohexyl phenyl ketone, 1-hydroxydimethyl phenyl ketone, 2-methyl-4'-methylthio-2-morpholinopropiophenone, or 2-benzyl-2-dimethylamino-1-(4-morpholinophenyl)-butanone 1, a benzoin such as benzoin methyl ether, benzoin ethyl ether, benzoin isopropyl ether, or benzyl dimethyl ether, a benzophenone such as benzophenone, 2,4'-dichlorobenzophenone, 4,4'-dichlorobenzophenone, or p-chlorobenzophenone, 2,4,6-trimethylbenzoyldiphenylphosphine oxide, an anthraquinone, and a thioxanthone. These photopolymerization initiators may be used singly, in combination of two or more kinds thereof, or in a eutectic mixture. Particularly, an acetophenone is preferably used from viewpoints of stability of a curable composition, polymerization reactivity, and the like.

As the photopolymerization initiator, a commercially available product may be used, and preferable examples thereof include, Irgacure (registered trademark) 819, 184, 907, and 651 manufactured by BASF Japan Ltd.

This hard coat layer can contain, as an additive, for example, a stabilizer, a surfactant, an infrared absorber, an ultraviolet absorber, a flame retardant, an antistatic agent, an antioxidant, a thermal stabilizer, a lubricant, a filler, a coloring agent, a dye, and an adhesion regulator.

The thickness of the hard coat layer is preferably 0.1 µm to 50 µm, and more preferably 1 to 20 µm from viewpoints of improving a hard coat property and improving transparency of the optical reflection film.

A method for forming the hard coat layer is not particularly limited, and examples thereof include a method for preparing a hard coat layer coating liquid containing the above components, then applying the coating liquid with a wire bar or the like, and curing the coating liquid by heat and/or UV to form a hard coat layer.

[Another Layer]

The optical reflection film according to the present invention may include a layer other than the above layers (another layer). For example, an intermediate layer can be disposed as another layer. Here, the "intermediate layer" means a layer between the substrate and the optical reflection layer or a layer between the substrate and the hard coat layer. Examples of a constituent material of the intermediate layer include a polyester resin, a polyvinyl alcohol resin, a polyvinyl acetate resin, a polyvinyl acetal resin, an acrylic resin, and a urethane resin. A substance having compatibility with an additive and low Tg is preferable. However, any substance can be used as long as these conditions are satisfied. The glass transition temperature (Tg) of the intermediate layer is preferably 30 to 120° C. because sufficient weather resistance can be obtained, and more preferably 30 to 90° C.

The intermediate layer can contain, as an additive, for example, a stabilizer, a surfactant, an infrared absorber, an ultraviolet absorber, a flame retardant, an antistatic agent, an antioxidant, a thermal stabilizer, a lubricant, a filler, a coloring agent, a dye, and an adhesion regulator.

[Application of Optical Reflection Film: Optical Reflector]

The optical reflection film of the present invention can be applied to a wide range of fields. For example, provided is an optical reflector in which the optical reflection film is disposed on at least one surface of a base. For example, the optical reflector is used as a window-bonding film such as a heat ray reflection film that is bonded to equipment (base) exposed to sunlight for a long period of time, such as an outdoor window of a building or an automobile window, to impart a heat ray reflection effect or a film for an agricultural vinyl house mainly in order to enhance weather resistance. Particularly, the optical reflector is preferable for a member in which the optical reflection film according to the present invention is bonded to a base such as glass or a resin substituted for glass directly or via an adhesive.

Specific examples of the base include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, an urethane resin, a polyvinyl acetate resin, a polyvinyl alcohol resin, a styrene resin, a vinyl chloride resin, a metal plate, and ceramic. The kind of resin may be any of a thermoplastic resin, a thermosetting resin, and an ionizing radiation curable resin, and two or more of these resins may be used in combination. The base can be manufactured by a known method such as extrusion molding, calendar molding, injection molding, blow molding, or compression molding. The thickness of the base is not particularly limited but is usually 0.1 mm to 5 cm.

The adhesive layer or pressure-sensitive adhesive layer for bonding the optical reflection film to the base is preferably disposed such that the optical reflection film is on a sunlight (heat ray) incident surface side when the optical reflection film is bonded to a window glass or the like. A case where the optical reflection film is sandwiched between a window glass and the base is preferable in durability because sealing from ambient gas such as moisture is possible. A case where the optical reflection film of the present invention is disposed outdoors or outside a vehicle (for outer bonding) is also preferable because of environmental durability.

As the adhesive applicable to the present invention, an adhesive containing a photocurable or thermosetting resin as a main component can be used.

The adhesive preferably has durability against ultraviolet rays and is preferably an acrylic pressure-sensitive adhesive or a silicone-based pressure-sensitive adhesive. An acrylic pressure-sensitive adhesive is preferable from viewpoints of pressure-sensitive adhesive characteristics and cost. Particularly, in solvent type and emulsion type acrylic pressure-sensitive adhesives, the solvent type acrylic pressure-sensitive adhesive is preferable because of easy control of peeling strength. In a case where a solution polymerized polymer is used as the solvent type acrylic pressure-sensitive adhesive, a known monomer can be used as a monomer therefor.

[Laminated Glass]

Laminated glass is a member in which the optical reflection film according to the present invention is bonded to a glass base via an intermediate film. The laminated glass can be used for building applications, residential applications, automobile applications, and the like.

One embodiment of the laminated glass has a structure in which an optical reflection film is sandwiched between two flat glasses using two intermediate films. The optical reflection film is the optical reflection film of the present invention described above. The optical reflection film may have a configuration in which a reflection layer is laminated on one surface of a substrate and a hard coat layer is applied onto the other surface. The optical reflection film may have a configuration in which the other surface of the substrate on one surface of which a reflection layer is laminated and the other surface of the substrate on one surface of which the hard coat layer is laminated are bonded with a pressure-sensitive adhesive layer.

Other constituent members of the laminated glass will be described below.

Intermediate Film

As a pair of intermediate films sandwiching the optical reflection film, any film can be used as long as having adhesion performance for bonding the optical reflection film to a glass plate together, but each of the intermediate films preferably contains a thermoplastic resin. The pair of intermediate films may be of the same kind or of different kinds. Examples of the thermoplastic resin include an ethylene-vinyl acetate copolymer (EVA) and polyvinyl butyral (PVB). Among these resins, PVB is preferable. Each of the intermediate films may appropriately contain an infrared absorber (for example, fine particles absorbing infrared rays), an ultraviolet absorber, an antioxidant, an antistatic agent, a thermal stabilizer, a lubricant, a filler, a coloring agent, a dye, an adhesion regulator, or the like. It is more possible to make solar transmittance 75% or more by inclusion of various fine particles absorbing infrared rays, an ultraviolet absorber, or the like, or coloring by mixing with a dye within a range not inhibiting the visible light transmittance.

Examples of the fine particles absorbing infrared rays include metal fine particles such as Ag, Al, and Ti, fine particles of metal nitride and metal oxide, cesium-doped tungsten oxide (CWO), and conductive transparent metal oxide fine particles such as ITO, ATO, aluminum zinc complex oxide (AZO), gallium-doped zinc oxide (GZO), and indium zinc complex oxide (IZO). One or more kinds are selected from these fine particles and added to the intermediate film to improve heat insulating performance. The conductive transparent metal oxide fine particles such as ITO, ATO, AZO, GZO, and IZO are particularly preferable.

Glass Plate

The kind of the pair of glass plates sandwiching the optical reflection film and the pair of intermediate films is not particularly limited and only needs to be selected depending on light transmission performance and heat insulating performance required for an application. Any of an inorganic glass plate, an organic glass plate, and an organic/inorganic hybrid glass plate may be used. The inorganic glass plate is not particularly limited, and examples thereof include various inorganic glass plates such as a float glass plate, a polished glass plate, a template glass plate, a meshed glass plate, a wire-containing glass plate, a heat ray absorbing glass plate, and a colored glass plate. Examples of the organic glass plate include a glass plate made of a polycarbonate resin, a polystyrene resin, or a polymethyl methacrylate resin. The organic glass plate may be a laminate formed by laminating a plurality of sheets made of the resin. Examples of the organic/inorganic hybrid glass plate include a hybrid glass plate in which silica is dispersed in a resin such as an epoxy resin. Regarding the color of the glass plate, not only a transparent glass plate but also glass plates of various colors such as general-purpose green, brown, and blue used for a vehicle or the like can be used. The glass plates may be of the same kind or of two or more kinds in combination.

The thickness of the glass plate is preferably about 1 to 10 mm in consideration of strength and transmission of infrared light in a visible light region. In a curved glass plate, the radius of curvature of the glass plate is preferably 0.5 to 2.0 m. If the radius of curvature of the glass plate is within this range, the optical reflection film can conform to the curved shape of the glass.

In general, heat insulating performance and solar heat shielding performance of an optical reflection film or an infrared shielding body can be determined by a method according to JIS R 3209 (1998) (Sealed insulating glass), JIS R 3106 (1998) (Testing method on transmittance, reflectance, and emittance of flat glasses, and evaluation of solar heat gain coefficient), and JIS R 3107 (1998) (Evaluation on thermal resistance of flat glasses and thermal heat transmittance of glazing).

For measurement of solar transmittance, solar reflectance, emittance, and visible light transmittance, (1) spectral transmittance and spectral reflectance of various single plate glasses are measured using a spectrophotometer with a wavelength (300 to 2500 nm). Emittance is measured using a spectrophotometer with a wavelength of 5.5 to 50 μm. Note that a default value is used for emittance of each of a float flat glass, a polished flat glass, a template flat glass, and a heat ray absorbing flat glass. (2) To calculate solar transmittance, solar reflectance, solar absorption ratio, and corrected emittance, solar transmittance, solar reflectance, solar absorption ratio, and vertical emittance are calculated in accordance with JIS R 3106 (1998). The corrected emittance is determined by multiplying the vertical emittance by a coefficient indicated in JIS R 3107 (1998). For calculation of heat insulating property and solar heat shielding property, (1) thermal resistance of sealed insulating glass is calculated according to JIS R 3209 (1998) using a measured value of thickness and the corrected emittance. However, in a case where the thickness of a hollow layer exceeds 2 mm, gas thermal conductance of the hollow layer is determined according to JIS R 3107 (1998). (2) Thermal insulating property is determined by adding heat transfer resistance to the thermal resistance of the sealed insulating glass and calculating the obtained value in terms of heat transmission resistance. (3) Solar heat shielding property is calculated by determining a solar heat gain coefficient according to JIS R 3106 (1998), and subtracting the obtained value from 1.

EXAMPLES

Hereinafter, the present invention will be specifically described with reference to Examples, but the present invention is not limited thereto. Incidentally, expression "part" or "%" used in Examples means "part by mass" or "% by mass" unless otherwise particularly specified. Each operation was performed at room temperature (25° C.) unless otherwise particularly specified.

(Manufacture of High Refractive Index Layer Coating Liquid 1)

To 384.8 g of a 30% by mass dispersion of zirconium oxide particles (SZR-W, zirconia sol, particle size distribution: D50 3 nm to 5 nm, manufactured by Sakai Chemical Industry Co.), 175.4 g of a citric acid aqueous solution (1.9% by mass) was added. To this solution, 1.94 g of a 5% by mass aqueous solution of a surfactant (Softazoline LMEB-R manufactured by Kawaken Fine Chemicals Co., Ltd.) was added, and the resulting solution was heated to 40° C. Subsequently, 120.4 g of an 8% by mass aqueous solution of ethylene-modified polyvinyl alcohol (manufactured by KURARAY CO., LTD., EXCEVAL RS2117, saponification degree: 97.5 to 99% by mol) was added thereto, and 9.9 g of pure water was further added thereto. The resulting solution was stirred for 10 minutes, and then 240.8 g of a 6% by mass aqueous solution of polyvinyl alcohol (JC-40, saponification degree: 99% by mass or more, manufactured by JAPAN VAM & POVAL CO., LTD.) and 66.7 g of pure water were added thereto. Thereafter, the resulting solution was stirred at 40° C. for 180 minutes to obtain a high refractive index layer coating liquid 1.

The refractive index of a monolayer manufactured using the high refractive index layer coating liquid 1 was 1.73. Note that a method for measuring the refractive index is as follows (the same applies hereinafter).

(Measurement of Monolayer Refractive Index of Each Layer)

In order to measure a refractive index, a sample was manufactured by applying the high refractive index layer coating liquid 1 onto a substrate with a monolayer, and the sample was cut into a size of 10 cm×10 cm. Thereafter, the refractive index was determined according to the following method. Using a spectrophotometer U-4100 (solid sample measuring system) manufactured by Hitachi, Ltd., a surface (back surface) opposite to a measurement surface of each sample was roughened and then subjected to a light absorption treatment with a black spray to prevent reflection of light on the back surface. Reflectance at 400 nm to 2500 nm was measured under a condition of 5° specular reflection, and the refractive index was determined from the result. The following refractive indices were values at 1000 nm considering wavelength dependency of the refractive index.

(Manufacture of Low Refractive Index Layer Coating Liquid 1)

In a stirring vessel, 4.65 g of an allylamine hydrochloride polymer (containing a primary amine salt) as a cationic polymer (PAA-HCL-03, weight average molecular weight: 3,000, 40% by mass aqueous solution, manufactured by Nittobo Medical Co., Ltd.), 3.8 g of an allylamine hydrochloride polymer (containing a primary amine salt) (PAA-HCL-10L, weight average molecular weight: 150,000, 40% by mass aqueous solution, manufactured by Nittobo Medical Co., Ltd.), 31 g of rinse water, and 31.9 g of boric acid (3% by mass aqueous solution) were mixed. To the resulting solution, 489.9 g of a 10% by mass aqueous solution of acidic colloidal silica (ST-OXS, concentration: 10%, average primary particle diameter: 4 to 6 nm, manufactured by Nissan Chemical Industries, Ltd.) was added. The resulting solution was heated to 40° C. while being stirred. To the resulting solution, 386.3 g of an 8% by mass aqueous solution of polyvinyl alcohol (JP-45, polymerization degree: 4500, saponification degree: 88% by mol, manufactured by JAPAN VAM & POVAL CO., LTD.), 30.5 g of emulsion resin (Superflex (registered trademark) 650, manufactured by First Industrial Pharmaceutical Co., Ltd.), 6.3 g of a 5% by mass solution of a surfactant (Softazoline LMEB-R, manufactured by Kawaken Fine Chemical Co., Ltd.), and 15 g of pure water were added and stirred and mixed at 40° C. to obtain a low refractive index layer coating liquid 1. The refractive index of a monolayer manufactured using the low refractive index layer coating liquid 1 was 1.48.

(Manufacture of Low Refractive Index Layer Coating Liquid 2)

In a stirring vessel, 4.65 g of an allylamine hydrochloride polymer (containing a primary amine salt) as a cationic polymer (PAA-HCL-03, weight average molecular weight: 3,000, 40% by mass aqueous solution, manufactured by Nittobo Medical Co., Ltd.), 6.07 g of a diallylamine hydrochloride polymer (containing a secondary amine salt) (PAS21CL, weight average molecular weight: 50,000, 25% by mass aqueous solution, manufactured by Nittobo Medical Co., Ltd.), 31 g of rinse water, and 31.9 g of boric acid (3% by mass aqueous solution) were mixed. To the resulting solution, 489.9 g of a 10% by mass aqueous solution of acidic colloidal silica (ST-OXS, concentration: 10%, average primary particle diameter: 4 to 6 nm, manufactured by Nissan Chemical Industries, Ltd.) was added. The resulting solution was heated to 40° C. while being stirred. To the resulting solution, 386.3 g of an 8% by mass aqueous solution of polyvinyl alcohol (JP-45, polymerization degree: 4,500, saponification degree: 88% by mol, manufactured by JAPAN VAM & POVAL CO., LTD.), 30.5 g of an emulsion resin (Superflex (registered trademark) 650, manufactured by First Industrial Pharmaceutical Co., Ltd.), 6.3 g of a 5% by mass solution of a surfactant (Softazoline LMEBR, manufactured by Kawaken Fine Chemical Co., Ltd.), and 15 g of pure water were added and stirred and mixed at 40° C. to obtain a low refractive index layer coating liquid 2. The refractive index of a monolayer manufactured using the low refractive index layer coating liquid 2 was 1.48.

(Manufacture of Low Refractive Index Layer Coating Liquid 3)

In a stirring vessel, 4.65 g of an allylamine hydrochloride polymer (containing a primary amine salt) as a cationic polymer (PAA-HCL-03, weight average molecular weight: 3,000, 40% by mass aqueous solution, manufactured by Nittobo Medical Co., Ltd.), 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.), 31 g of rinse water, and 31.9 g of boric acid (3% by mass aqueous solution) were mixed. To the resulting solution, 489.9 g of a 10% by mass aqueous solution of acidic colloidal silica (ST-OXS, average primary particle diameter: 4 to 6 nm, manufactured by Nissan Chemical Industries, Ltd.) was added. The resulting solution was heated to 40° C. while being stirred. To the resulting solution, 386.3 g of an 8% by mass aqueous solution of polyvinyl alcohol (JP-45, polymerization degree: 4,500, saponification degree: 88% by mol, manufactured by JAPAN VAM & POVAL CO., LTD.), 30.5 g of emulsion resin (Superflex (registered trademark) 650, manufactured by First Industrial Pharmaceutical Co., Ltd.), 6.3 g of a 5% by mass solution of a surfactant (Softazoline LMEB-R, manufactured by Kawaken Fine Chemical Co., Ltd.), and 15 g of pure water were added and stirred and mixed at 40° C. to obtain a low refractive index layer coating liquid 3. The refractive index of a monolayer manufactured using the low refractive index layer coating liquid 3 was 1.48.

(Manufacture of Low Refractive Index Layer Coating Liquid 4)

A low refractive index layer coating liquid 4 was manufactured in a similar manner to manufacture of the low refractive index layer coating liquid 3 except that 4.65 g of an allylamine hydrochloride polymer (containing a primary amine salt) (PAA-HCL-03, weight average molecular weight: 3,000, 40% by mass aqueous solution, manufactured by Nittobo Medical Co., Ltd.) was changed to 7.45 g of a diallylamine hydrochloride polymer (containing a secondary amine salt) (PAS-21CL, weight average molecular weight: 50,000, 25% by mass aqueous solution, manufactured by Nittobo Medical Co., Ltd.). The refractive index of a monolayer manufactured using the low refractive index layer coating liquid 4 was similar to that in a case of the low refractive index layer coating liquid 3.

(Manufacture of Low Refractive Index Layer Coating Liquid 5)

A low refractive index layer coating liquid 5 was manufactured in a similar manner to manufacture of the low refractive index layer coating liquid 3 except that 4.65 g of an allylamine hydrochloride polymer (containing a primary amine salt) (PAA-HCL-03, weight average molecular weight: 3,000, 40% by mass aqueous solution, manufactured by Nittobo Medical Co., Ltd.) was changed to 6.65 g of a diallyldimethylammonium chloride polymer (containing a quaternary ammonium group) (PAS-H1, weight average molecular weight: 8,500, 28% by mass aqueous solution, manufactured by Nittobo Medical Co., Ltd.). The refractive index of a monolayer manufactured using the low refractive index layer coating liquid 5 was similar to that in a case of the low refractive index layer coating liquid 3.

(Manufacture of Low Refractive Index Layer Coating Liquid 6)

A low refractive index layer coating liquid 6 was manufactured in a similar manner to manufacture of the low refractive index layer coating liquid 3 except that 4.65 g of an allylamine hydrochloride polymer (containing a primary amine salt) (PAA-HCL-03, weight average molecular weight: 3,000, 40% by mass aqueous solution, manufactured by Nittobo Medical Co., Ltd.) was changed to 3.7 g of a methyldiallylamine hydrochloride polymer (containing a tertiary amine salt) (PAS M-1, weight average molecular weight: 20,000, 50% by mass aqueous solution, manufactured by Nittobo Medical Co., Ltd.). The refractive index of a monolayer manufactured using the low refractive index layer coating liquid 6 was similar to that in a case of the low refractive index layer coating liquid 3.

(Manufacture of Low Refractive Index Layer Coating Liquid 7)

A low refractive index layer coating liquid 7 was manufactured in a similar manner to manufacture of the low refractive index layer coating liquid 6 except that 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed to 3.80 g of an allylamine hydrochloride polymer (containing a primary amine salt) (PAAHCL-03, weight average molecular weight: 3,000, 40% by mass aqueous solution, manufactured by Nittobo Medical Co., Ltd.). The refractive index of a monolayer manufactured using the low refractive index layer coating liquid 7 was similar to that in a case of the low refractive index layer coating liquid 6.

(Manufacture of Low Refractive Index Layer Coating Liquid 8)

A low refractive index layer coating liquid 8 was manufactured in a similar manner to manufacture of the low refractive index layer coating liquid 6 except that 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed to 6.07 g of a diallylamine hydrochloride polymer (containing a secondary amine salt) (PAS-21CL, weight average molecular weight: 50,000, 25% by mass aqueous solution, manufactured by Nittobo Medical Co., Ltd.). The refractive index of a monolayer manufactured using the low refractive index layer coating liquid 8 was similar to that in a case of the low refractive index layer coating liquid 6.

(Manufacture of low refractive index layer coating liquid 9)

A low refractive index layer coating liquid 9 was manufactured in a similar manner to manufacture of the low refractive index layer coating liquid 6 except that 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed to 6.46 g of polyaluminum chloride (Takibine 1500, 23% by mass aqueous solution, manufactured by Taki Chemical Co., Ltd.). The refractive index of a monolayer manufactured using the low refractive index layer coating liquid 9 was similar to that in a case of the low refractive index layer coating liquid 6.

(Manufacture of Low Refractive Index Layer Coating Liquid 10)

A low refractive index layer coating liquid 10 was manufactured in a similar manner to manufacture of the low refractive index layer coating liquid 6 except that 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed to 5.4 g of a diallyldimethylammonium chloride polymer (containing a quaternary ammonium group) (PAS H-1, weight average molecular weight: 8,500, 28% by mass aqueous solution, manufactured by Nittobo Medical Co., Ltd.). The refractive index of a monolayer manufactured using the low refractive index layer coating liquid 10 was similar to that in a case of the low refractive index layer coating liquid 6.

(Manufacture of Low Refractive Index Layer Coating Liquid 11)

A low refractive index layer coating liquid 11 was manufactured in a similar manner to manufacture of the low refractive index layer coating liquid 6 except that the addition amount of a methyldiallylamine hydrochloride polymer (containing a tertiary amine salt) (PAS M-1, weight average molecular weight: 20,000, 50% by mass aqueous solution, manufactured by Nittobo Medical Co., Ltd.) was changed from 3.7 g to 4.12 g. The refractive index of a monolayer manufactured using the low refractive index layer coating liquid 11 was similar to that in a case of the low refractive index layer coating liquid 6.

(Manufacture of Low Refractive Index Layer Coating Liquid 12)

A low refractive index layer coating liquid 12 was manufactured in a similar manner to manufacture of the low refractive index layer coating liquid 6 except that the addition amount of a methyldiallylamine hydrochloride polymer (containing a tertiary amine salt) (PAS M-1, weight average molecular weight: 20,000, 50% by mass aqueous solution, manufactured by Nittobo Medical Co., Ltd.) was changed from 3.7 g to 3.33 g. The refractive index of a monolayer manufactured using the low refractive index layer coating liquid 12 was similar to that in a case of the low refractive index layer coating liquid 6.

(Manufacture of Low Refractive Index Layer Coating Liquid 13)

A low refractive index layer coating liquid 13 was manufactured in a similar manner to manufacture of the low refractive index layer coating liquid 6 except that the addition amount of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed from 5.4 g to 5.95 g. The refractive index of a monolayer manufactured using the low refractive index layer coating liquid 13 was similar to that in a case of the low refractive index layer coating liquid 6.

(Manufacture of Low Refractive Index Layer Coating Liquid 14)

A low refractive index layer coating liquid 14 was manufactured in a similar manner to manufacture of the low refractive index layer coating liquid 6 except that 5.4 g of a diallyldimethylammonium chloride polymer (PAS H-5, weight average molecular weight: 30,000, 28% by mass aqueous solution, manufactured by Nittobo Medical Co., Ltd.) was changed to 5.4 g of a diallyldimethylammonium chloride polymer (containing a quaternary ammonium group) (PAS-H10, weight average molecular weight: 200,000, 28% by mass aqueous solution, manufactured by Nittobo Medical Co., Ltd.). The refractive index of a monolayer manufactured using the low refractive index layer coating liquid 14 was similar to that in a case of the low refractive index layer coating liquid 6.

(Manufacture of Low Refractive Index Layer Coating Liquid 15)

A low refractive index layer coating liquid 15 was manufactured in a similar manner to manufacture of the low refractive index layer coating liquid 6 except that 5.4 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.) was changed to 7.23 g of an allylamine hydrochloride/diallyamine hydrochloride copolymer (containing a primary amine salt and a secondary amine salt) (PAA-D19-HCl, weight average molecular weight: 40,000, 21% by mass aqueous solution, manufactured by Nittobo Medical Co., Ltd.). The refractive index of a monolayer manufactured using the low refractive index layer coating liquid 15 was similar to that in a case of the low refractive index layer coating liquid 6.

(Manufacture of Low Refractive Index Layer Coating Liquid 16)

A low refractive index layer coating liquid 16 was manufactured in a similar manner to manufacture of the low refractive index layer coating liquid 15 except that 3.7 g of a methyldiallyamine hydrochloride polymer (containing a tertiary amine salt) (PAS M-1, weight average molecular weight: 20,000, 50% by mass aqueous solution, manufactured by Nittobo Medical Co., Ltd.) was changed to 6.65 g of a diallyldimethylammonium chloride polymer (containing a quaternary ammonium group) (PAS H-5, weight average molecular weight: 30,000, 28% by mass aqueous solution, manufactured by Nittobo Medical Co., Ltd.). The refractive index of a monolayer manufactured using the low refractive index layer coating liquid 16 was similar to that in a case of the low refractive index layer coating liquid 15.

(Manufacture of Low Refractive Index Layer Coating Liquid 17)

A low refractive index layer coating liquid 17 was manufactured in a similar manner to manufacture of the low refractive index layer coating liquid 5 except that no diallyldimethylammonium chloride polymer (containing a quaternary ammonium group) (PAS H-5, weight average molecular weight: 30,000, 28% by mass aqueous solution, manufactured by Nittobo Medical Co., Ltd.) was added and the addition amount of PAS H-1 was increased to 12.1 g. The refractive index of a monolayer manufactured using the low refractive index layer coating liquid 17 was similar to that in a case of the low refractive index layer coating liquid 5.

(Manufacture of Low Refractive Index Layer Coating Liquid 18)

A low refractive index layer coating liquid 18 was manufactured in a similar manner to manufacture of the low refractive index layer coating liquid 16 except that no allylamine hydrochloride/diallyamine hydrochloride copolymer (containing a primary amine salt and a secondary amine salt) (PAA-D19-HCl, weight average molecular weight: 40,000, 21% by mass aqueous solution, manufactured by Nittobo Medical Co., Ltd.) was added and the addition amount of PAS H-5 was increased to 12.1 g. The refractive index of a monolayer manufactured using the low refractive index layer coating liquid 18 was similar to that in a case of the low refractive index layer coating liquid 16.

(Manufacture of Low Refractive Index Layer Coating Liquid 19)

A low refractive index layer coating liquid 19 was manufactured in a similar manner to manufacture of the low refractive index layer coating liquid 6 except that no diallyldimethylammonium chloride polymer (containing a quaternary ammonium group) (PAS H-5, weight average molecular weight: 30,000, 28% by mass aqueous solution, manufactured by Nittobo Medical Co., Ltd.) was added and the addition amount of PAS M-1 was increased to 6.72 g. The refractive index of a monolayer manufactured using the low refractive index layer coating liquid 19 was similar to that in a case of the low refractive index layer coating liquid 6.

(Manufacture of Low Refractive Index Layer Coating Liquid 20)

A low refractive index layer coating liquid 20 was manufactured in a similar manner to manufacture of the low refractive index layer coating liquid 1 except that 14.4 g of polyaluminum chloride (Takibine 1500, 23% by mass aqueous solution, manufactured by Taki Chemical Co., Ltd.) was used in place of 4.65 g of an allylamine hydrochloride polymer (PAA-HCL-03, primary amine, weight average molecular weight: 3,000, 40% by mass aqueous solution, manufactured by Nittobo Medical Co., Ltd.) and 5.4 g of a diallyldimethylammonium chloride polymer (PAS H-5, quaternary ammonium, weight average molecular weight: 30,000, 28% by mass aqueous solution, manufactured by Nittobo Medical Co., Ltd.). The refractive index of a monolayer manufactured using the low refractive index layer coating liquid 20 was similar to that in a case of the low refractive index layer coating liquid 1.

Example 1

Using a slide bead (slide hopper) coating apparatus capable of 21 layer-multilayer coating, the high refractive index layer coating liquid 1 and the low refractive index layer coating liquid 1 manufactured above were laminated on a polyethylene terephthalate film having a thickness of 50 µm (A4300 manufactured by Toyobo Co., Ltd., double-sided easy adhesion layer, length 200 m×width 210 mm) while the temperature of the high refractive index layer coating liquid 1 and the low refractive index layer coating liquid 1 was kept at 40° C. At this time, simultaneous multilayer coating of 21 layers in total was performed such that a lowermost layer and an uppermost layer (outermost layer) were low refractive index layers, and the other layers were alternating high refractive index layers and low refractive index layers. At this time, the dry film thickness was adjusted such that the lowermost layer was 1510 nm, the outermost layer was 100 nm, each of the low refractive index layers other than the lowermost layer and the outermost layer was 150 nm, and each of the high refractive index layers was 150 nm.

Immediately after coating, cold air of 5° C. was blown against the coating film to thicken the coating film. After thickening, hot air of 80° C. was blown against the coating film to dry the coating film, and an optical reflection film 1 having an optical reflection layer formed of 21 layers in total was manufactured.

Examples 2 to 16 and Comparative Examples 1 to 4

Optical reflection films 2 to 16 and comparative optical reflection films 1 to 4 were manufactured in a similar manner to Example 1 except that the coating liquid used for forming the low refractive index layer in Example 1 was changed to low refractive index layer coating liquids 2 to 20 illustrated in Table 1, respectively. Note that the content of a cationic polymer represents a value in terms of % by mass with respect to the mass of silicon oxide in Table 1.

[Evaluation]

(Measurement of Haze)

The haze of each of the optical reflection films obtained in the above Examples and Comparative Examples was measured with a haze meter (NDH 2000 manufactured by Nippon Denshoku Industries Co., Ltd.). Note that a halogen sphere of 5V9W was used as a light source of the haze meter and that a silicon photocell (with spectral luminous efficiency filter) was used as a light receiving portion. Measurement of the haze was performed under conditions of 23° C. and 55% RH. Results thereof are illustrated in the following Table 1. Note that a haze value of an optical reflection film is preferably 1.5% or less.

(Cracking Test)

Each of the optical reflection films manufactured in the above Examples and Comparative Examples was bonded to a blue glass having a thickness of 3 mm via a pressure-sensitive adhesive layer.

Specifically, the following pressure-sensitive adhesive layer forming coating liquid was applied onto a silicone releasing surface of a separator NS23MA manufactured by Nakamoto Pax Co., Ltd. with a comma coater so as to have a dry film thickness of 10 μm and dried at 90° C. for one minute to form a pressure-sensitive adhesive layer. The film having an optical reflection layer formed therein, obtained above, was bonded to this pressure-sensitive adhesive layer to form a pressure-sensitive adhesive layer on the optical reflection layer.

Preparation of Pressure-Sensitive Adhesive Layer Forming Coating Liquid

To Corponyl (registered trademark) N-6941M (manufactured by Nippon Synthetic Chemical Industry Co., Ltd.) as a pressure-sensitive adhesive, 3% by mass of Coronate L-55E (manufactured by Nippon Polyurethane Industry Co., Ltd.) as a curing agent was added. Furthermore, 5% by mass of Tinuvin 477 (manufactured by BASF Japan Co., Ltd.) as an ultraviolet absorber was added thereto. The resulting solution was diluted with ethyl acetate as a solvent so as to have a solid content of 10% by mass to prepare a pressure-sensitive adhesive layer forming coating liquid.

This sample was exposed to xenon light having an intensity of 160 w/m$^2$ for 2000 hours using a xenon weather meter (manufactured by Suga Test Instruments Co., Ltd., emitting light extremely close to sunlight) under conditions of 30° C. and 60% RH. Thereafter, whether film cracking occurred in a film was observed with a magnification of 12 in three fields of view using a polarizing microscope, and evaluation was performed according to the following evaluation criteria. Results thereof are illustrated in the following Table 1. Note that a sample evaluated as 0 or 1 in the following evaluation criteria can be used without problems in practical use.

0: Cracks and the like are not observed

1: One or more cracks are observed in total in three fields of view

2: A crack is observed in each of three fields of view

3: A crack is observed in the entire field of view.

(Measurement of Near-Infrared Reflectance)

Using a U-4000 type (using an integrating sphere, manufactured by Hitachi, Ltd.) as a spectrophotometer, reflectances of each of the optical reflection films of Examples and Comparative Examples in a region of 800 to 1400 nm were measured, and a maximum value thereof was determined and taken as a near-infrared reflectance. It has been confirmed that a good near-infrared reflectance of about 70% can be obtained in each of the optical reflection films of Examples and Comparative Examples.

TABLE 1

| | Low refractive index layer coating liquid | Cationic polymer 1 | | | | Cationic polymer 2 | | | | | |
|---|---|---|---|---|---|---|---|---|---|---|---|
| | | Compound | Cationic group | MW | Content (% by mass) | Compound | Cationic group | MW | Content (% by mass) | Haze (%) | Crack |
| Example 1 | 1 | PAA HCL-03 | Primary amine salt | 3000 | 3.8 | PAA HCL-10L | Primary amine salt | 150000 | 3.1 | 1.5 | 1 |
| Example 2 | 2 | PAA HCL-03 | Primary amine salt | 3000 | 3.8 | PAS 21CL | Secondary amine salt | 50000 | 3.1 | 1.5 | 1 |
| Example 3 | 3 | PAA HCL-03 | Primary amine salt | 3000 | 3.8 | H-5 | Quaternary ammonium group | 30000 | 3.1 | 1.3 | 1 |
| Example 4 | 4 | PAS 21CL | Secondary amine salt | 50000 | 3.8 | H-5 | Quaternary ammonium group | 30000 | 3.1 | 1.3 | 1 |
| Example 5 | 5 | H-1 | Quaternary ammonium group | 8500 | 3.8 | H-5 | Quaternary ammonium group | 30000 | 3.1 | 1.1 | 1 |
| Example 6 | 6 | M-1 | Tertiary amine salt | 20000 | 3.8 | H-5 | Quaternary ammonium group | 30000 | 3.1 | 0.5 | 0 |

TABLE 1-continued

| | Low refractive index layer coating liquid | Cationic polymer 1 | | | | Cationic polymer 2 | | | | Haze (%) | Crack |
|---|---|---|---|---|---|---|---|---|---|---|---|
| | | Compound | Cationic group | MW | Content (% by mass) | Compound | Cationic group | MW | Content (% by mass) | | |
| Example 7 | 7 | M-1 | Tertiary amine salt | 20000 | 3.8 | PAA HCL-03 | Primary amine salt | 3000 | 3.1 | 1.2 | 1 |
| Example 8 | 8 | M-1 | Tertiary amine salt | 20000 | 3.8 | PAS 21CL | Secondary amine salt | 50000 | 3.1 | 1.2 | 1 |
| Example 9 | 9 | M-1 | Tertiary amine salt | 20000 | 3.8 | Takibine 1500 | Aluminum salt | — | 3.1 | 1.1 | 1 |
| Example 10 | 10 | M-1 | Tertiary amine salt | 20000 | 3.8 | H-1 | Quaternary ammonium group | 8500 | 3.1 | 0.8 | 0 |
| Example 11 | 11 | M-1 | Tertiary amine salt | 20000 | 4.2 | H-5 | Quaternary ammonium group | 30000 | 3.1 | 0.4 | 0 |
| Example 12 | 12 | M-1 | Tertiary amine salt | 20000 | 3.4 | H-5 | Quaternary ammonium group | 30000 | 3.1 | 0.6 | 0 |
| Example 13 | 13 | M-1 | Tertiary amine salt | 20000 | 3.8 | H-5 | Quaternary ammonium group | 30000 | 3.4 | 0.4 | 0 |
| Example 14 | 14 | M-1 | Tertiary amine salt | 20000 | 3.8 | H-10 | Quaternary ammonium group | 200000 | 3.1 | 0.8 | 0 |
| Example 15 | 15 | M-1 | Tertiary amine salt | 20000 | 3.8 | PAA-D19-HCl | Primary amine salt + Secondary amine salt | 40000 | 3.1 | 1.2 | 1 |
| Example 16 | 16 | H-5 | Quaternary ammonium group | 30000 | 3.8 | PAA-D19-HCl | Primary amine salt + Secondary amine salt | 40000 | 3.1 | 1.2 | 1 |
| Comparative Example 1 | 17 | H-1 | Quaternary ammonium group | 8500 | 6.9 | — | — | — | — | 3.8 | 3 |
| Comparative Example 2 | 18 | H-5 | Quaternary ammonium group | 30000 | 6.9 | — | — | — | — | 4.3 | 3 |
| Comparative Example 3 | 19 | M-1 | Tertiary amine salt | 20000 | 6.9 | — | — | — | — | 3.2 | 3 |
| Comparative Example 4 | 20 | Takibine 1500 | Aluminum salt | — | 6.9 | — | — | — | — | 2.1 | 2 |

Table 1 above indicates that the optical reflection films of Examples 1 to 16, each containing two or more amine polymers in the low refractive index layer, have haze largely reduced and excellent crack resistance as compared with Comparative Examples 1 to 4.

Among these films, the optical reflection films of Examples 6 and 10 to 14, each containing a cationic polymer containing a tertiary amino group or a cation (salt) thereof and a cationic polymer containing a quaternary ammonium group, have an excellent effect for reducing haze, and particularly, the optical reflection films of Examples 6 and 11 to 13 in which the weight average molecular weight of the cationic polymer is 20,000 to 30,000 have haze reduced.

Note that the present application is based on Japanese Patent Application No. 2015-255322 filed on Dec. 25, 2015, the disclosed contents of which are incorporated herein by reference as a whole.

The invention claimed is:

1. An optical reflection film comprising at least one unit formed by laminating a low refractive index layer and a high refractive index layer on a substrate, wherein
the high refractive index layer contains zirconium oxide particles, and
the low refractive index layer contains silicon oxide particles and two or more cationic polymers,
wherein the two or more cationic polymers include a cationic polymer containing a tertiary amino group or a cation (salt) thereof and a cationic polymer containing a quaternary ammonium group, and
wherein the cationic polymer containing a tertiary amino group or a cation (salt) thereof comprises a methyldiallylamine hydrochloride polymer, a methyldiallylamine amide sulfate polymer, a methyldiallylamine acetate polymer, or a combination thereof.

2. The optical reflection film according to claim 1, wherein the two or more cationic polymers each have a weight average molecular weight of 20,000 to 30,000.

3. A method for manufacturing the optical reflection film according to claim 2, comprising laminating the high refractive index layer and the low refractive index layer by a simultaneous multilayer coating method.

4. A method for manufacturing the optical reflection film according to claim 1, comprising laminating the high refractive index layer and the low refractive index layer by a simultaneous multilayer coating method.

5. The optical reflection film of claim 1, wherein the low refractive index layer and the high refractive index layer each further comprise a polyvinyl alcohol.

6. The optical reflection film of claim 5, wherein a saponification degree of the polyvinyl alcohol in the high refractive index layer is different from a saponification degree of the polyvinyl alcohol in the low refractive index layer.

7. The optical reflection film of claim 6, wherein the difference in the saponification degree of the polyvinyl alcohol in the high refractive index layer and the saponification degree of the polyvinyl alcohol in the low refractive index layer is 3% by mol to 20% by mol.

8. An optical reflection film comprising at least one unit formed by laminating a low refractive index layer and a high refractive index layer on a substrate, wherein
  the high refractive index layer contains zirconium oxide particles, and
  the low refractive index layer contains silicon oxide particles and two or more cationic polymers,
  wherein the two or more cationic polymers include a cationic polymer containing a tertiary amino group or a cation (salt) thereof and a cationic polymer containing a quaternary ammonium group, and
  wherein the cationic polymer containing a quaternary ammonium group comprises a diallyldimethylammonium chloride polymer.

* * * * *